(12) United States Patent
Mizuhara et al.

(10) Patent No.: US 6,720,545 B2
(45) Date of Patent: Apr. 13, 2004

(54) PHOTOELECTRIC SENSOR, CONTROL METHOD THEREFOR AND SEMICONDUCTOR INTEGRATED CIRCUIT THEREFOR

(75) Inventors: Susumu Mizuhara, Kyoto (JP); Arata Nakamura, Kyoto (JP); Hiroaki Nakanishi, Kyoto (JP); Toshiaki Koya, Osaka (JP)

(73) Assignee: Omron Corporation, Kyoto (JP)

(*) Notice: Subject to any disclaimer, the term of this patent is extended or adjusted under 35 U.S.C. 154(b) by 0 days.

(21) Appl. No.: 10/132,068

(22) Filed: Apr. 24, 2002

(65) Prior Publication Data

US 2003/0010891 A1 Jan. 16, 2003

(30) Foreign Application Priority Data

May 2, 2001 (JP) .................................... 2001-135635
Apr. 17, 2002 (JP) .................................... 2002-115531

(51) Int. Cl.$^7$ ............................................. H01J 40/14
(52) U.S. Cl. ........................ 250/214 SW; 250/221; 327/514
(58) Field of Search ................... 250/205, 214 SW, 250/214 R, 214 C; 327/514, 551–552

(56) References Cited

U.S. PATENT DOCUMENTS

| | | | | |
|---|---|---|---|---|
| 4,381,446 A | * | 4/1983 | Fukuyama et al. | 250/214 R |
| 4,388,527 A | * | 6/1983 | Fukuyama et al. | 250/214 R |
| 5,243,181 A | * | 9/1993 | Bondarev et al. | 250/214 B |
| 6,271,512 B1 | * | 8/2001 | Lewis | 250/221 |

* cited by examiner

*Primary Examiner*—David Porta
*Assistant Examiner*—Patrick J. Lee
(74) *Attorney, Agent, or Firm*—Beyer Weaver & Thomas LLP

(57) ABSTRACT

A photoelectric sensor transmits pulsed light repetitively, receives light which may include noise and generates a corresponding electrical reception signal. The level of reception signal is compared with a specified threshold value at a timing which is slightly delayed from the timing of light transmission. A sensor output is generated on the basis of the result of this comparison. If periodically changing noise is present and the reception signal has an AC waveform, the level of the reception signal is compared with another threshold value proximal to an AC zero level. The timing of next light transmission is controlled on the basis of the result of the second comparison.

18 Claims, 18 Drawing Sheets

PHOTOELECTRIC SENSOR, CONTROL METHOD THEREFOR AND SEMICONDUCTOR INTEGRATED CIRCUIT THEREFOR

BACKGROUND OF THE INVENTION

This invention relates to a photoelectric sensor using light pulses for detecting the presence or absence of a target object, its distance, its size and its characteristics. In particular, this invention relates to such a photoelectric sensor provided with means for preventing erroneous operations even in an environment where there are periodic noise pulses appearing at a timing which coincides with the timing for judging received light.

For detecting the presence or absence of an object, its distance and its characteristics in a non-contacting manner, it has been known to utilize photoelectric sensors using light pulses which are variously called a photoelectric sensor, a distance sensor or a displacement sensor. Photoelectric sensors using light pulses are generally composed of a light transmitter for transmitting light pulses to a target area and a light receiver for receiving light pulses coming from the target area. They may be broadly divided into the transmitting type and the reflecting type. With a photoelectric sensor of the transmitting type, the light pulses transmitted from the light transmitter fail to be received by the light receiver if it is interrupted by a target object for detection. In the case of a photoelectric sensor of the reflecting type, by contrast, the light pulses transmitted from the light transmitter is received by the light receiver by being reflected by a target object.

These sensors may be divided also into an integrated type having both its light transmitter and receiver contained in a common housing structure and a separated type having them contained in individual housing structures. The integrated type is advantageous in that the light transmitter and receiver can be more easily correlated or synchronized. Many of photoelectric sensors of the reflection type and those of the transmitting type having separated heads such as those using fiber optics are structured as an integrated type. Many of the sensors of the transmitting type with the non-separated type of heads are structured as a separated type.

Where a photoelectric sensor is installed, noise of different kinds such as light and electromagnetic waves is expected to be present in addition to light pulses emitted from the sensor itself. Because of the noise of these kinds in the environment, noise pulses appear in the output line passing through the capacitor connecting a converter such as a photoelectric converter element in the light receiver, mixed in either through the converter or through the power source line. Some of such noise pulses appear periodically, while some appear at random.

Many different methods have been developed for preventing erroneous operations of a light receiver caused by such noise pulses. One of the methods is based on the synchronization technology whereby the timing of light transmission from the light transmitter and that of light reception by the light receiver are synchronized. Another method is based on the identification of a pulse array. The sensor output will not be switched on unless more than a specified minimum number of pulses are detected continuously. Once the sensor output is switched on, it is not switched off unless more than another specified number of pulses are missed. Still another method is a combination of both of these technologies such that the synchronization technology is used in the first stage to eliminate the noise pulses not in accordance with the received light level and then the pulse array is identified in the later stage to eliminate noise pulses which happened to be in synchronism with the judgment timing, or the timing of light transmission.

Such prior art methods are effective against noise pulses which appear randomly in the reception signal. If the noise pulses appear periodically and if the timing of their appearance coincides with the judgment timing, or the timing of light transmission, they can hardly be effective. Examples of such a situation occur in factories and storehouses where fluorescent lamps inclusive of the general frequency types and inverter types are commonly used. Since the timing of light transmission from such sensors cannot be varied too widely in view of the level of response required of the sensor, there is also a limit within which the effects of noise pulses can be avoided by varying the timing of light transmission.

SUMMARY OF THE INVENTION

It is therefore an object of this invention in view of the situation described above to provide a photoelectric sensor using light pulses with which erroneous operations can be effectively avoided even where noise pulses appear periodically and at a timing that coincides with that of the transmission of light.

It is another object to develop basic technologies for such improved photoelectric sensors.

In one aspect, this invention relates to a method for controlling a photoelectric sensor which transmits pulsed light repetitively by driving a light transmitting element at a specified light transmission timing and compares with a specified threshold value the level of what is herein referred to as the reception signal which is an electrical signal obtained by processing light received by a light receiving element at a timing (referred to as the level judging timing) with a slight delay from the aforementioned light transmission timing. If an AC waveform corresponding to noise is included in the reception signal, the light transmission from the sensor is controlled such that a zero-cross timing of this AC waveform and the level-judging timing will coincide, and a sensor output is generated on the basis of the result of the aforementioned comparison.

In the above, the "specified threshold value" may be determined on the basis of known level of reception signals based on light emitted by the sensor itself. The "slight delay" for defining a timing in such a situation is a commonly known method of correlating (or synchronizing) light transmission and light detection. Thus, the invention does not require this slight delay to be non-zero, that is, the comparison with this threshold value may be initiated at the same timing as the beginning of light transmission.

"Noise" may be of different origins. Noise due to light mixed in through the light receiving element such as light from an inverter type fluorescent lamp, as well as electromagnetic wave noise mixed in through a power line, may be included. Thus, "AC waveform", referred to above, includes not only sinusoidal waveforms with regularly changing signal levels but also various waveforms with output polarity changing frequently through an AC zero-level.

The zero-cross timing and the level-judging timing need not be matched exactly. Some degree of mismatching is allowed. The allowable range of mismatching may be determined, depending upon the level-judging timing such as the time during which the sampling gate is left open in the case of a sensor having a sampling gate, the output characteristics of the AC waveform corresponding to noise, and the threshold value for the judgment.

According to a method of this invention, the level of reception signal is judged at the zero-cross timing of the AC waveform corresponding to the noise (referred to as the "noise output") or when the noise output has its minimum value even if the sensor is being used in an environment where an AC waveform corresponding to noise is likely to appear in the reception signal such as immediately below an inverter type fluorescent lamp. Thus, an erroneous operation, such as outputting a judgment of presence of light (transmitted from the sensor itself) although no light pulse transmitted from the sensor itself is being received, can be avoided according to this invention.

In the method embodying this invention, it is preferable to select a zero-cross timing at which the polarity of the AC waveform corresponding to noise is changing to become opposite the polarity of waveform of reception signal corresponding to pulsed light transmitted from the sensor itself. The "polarity of the waveform of reception signal corresponding to pulsed light from the sensor itself" may be the same as the polarity of the "specified threshold" for judging the level of the reception signal. This threshold value is usually selected on the side of the peak which appears on the waveform of the reception signal based on the pulse light transmitted from the sensor itself. If peaks appear on both sides due, for example, to the characteristics of the output circuit and threshold values with both polarities are set, one of the threshold values may be selected and its polarity may be defined as the "polarity of the reception signal waveform".

According to this preferred embodiment, in summary, the zero-cross timing is selected such that the AC waveform corresponding to noise is changing so as to have the opposite polarity to where the threshold value is set such that appearance of noise output in excess of the threshold value during the period of level-judgment (for example, while the sampling gate remains open) can be dependably avoided. This also makes it possible to set the period of level-judgment somewhat longer.

In another aspect, this invention relates to a photoelectric sensor characterized as comprising not only light transmitting means for transmitting pulsed light repetitively by driving a light transmitting element at a specified light transmission timing, light receiving means for receiving light and outputting an electrical reception signal corresponding to the received light, first level judging means for comparing the level of the reception signal with a specified first threshold value, thereby judging the level of the reception signal at a level-judging timing which is slightly delayed from the light transmission timing, and signal processor means for generating a sensor output based upon the result of a comparison by the first level judging means, but also second level judging means for comparing the level of the reception signal with a threshold value proximal to an AC zero level, thereby judging the level of the reception signal, and transmission timing control means for controlling the timing of next light transmission from the light transmitting means based upon the result of a comparison by the second level judging means. With such a photoelectric sensor, appearance of noise output measured by the threshold value near the AC zero can be detected by the second level judging means and the timing of light transmission can be controlled according to the condition of appearance of such noise output. Thus, the reception signal level can be judged when there is hardly any noise output or the noise output is near the AC zero level such that erroneous operations due to noise can be prevented. The second threshold is merely required to be "proximal" to an AC zero level. It naturally depends on the characteristics of the sensor how proximal the second threshold should be to an AC zero level but it should be clear to a person skilled in the art, since this threshold value is for the purpose of preventing erroneous operations due to noise, that this threshold value must at least be smaller than the threshold value of the first level judging means.

According to a first embodiment of the invention, the transmission timing control means delays the timing of next light transmission, after an official light transmission period has elapsed since the previous timing of light transmission, until the second level judging means determines that the level of the reception signal is close to the AC zero level. The "official light transmission period" is a fixed period for the periodic transmission of pulse light from the light transmitting means. The interval between successive transmissions of light will change according to this embodiment, however, depending on the result of judgment by the second level judging means. The actual interval is the sum of the official light transmission period and the variable time required for the second level judging means to conclude that the reception signal level has come close to the zero level. According to the first embodiment of this invention, therefore, a minimum of the so-called official light transmitting period is maintained between successive light transmissions and each light pulse transmission takes place only when the level of the reception signal is determined to be near an AC zero level. Thus, the erroneous operations of the sensor can be prevented even more dependably.

The judgment that the level of the reception signal is close to an AC zero level may be made by the second level judging means by employing two threshold values near the AC zero level, one of them having positive polarity and the other having negative polarity. The judgment that the level of the reception signal is "close" to an AC zero may be made only if the level of received signal is within a range sandwiched between these two threshold values.

According to a second embodiment of the invention, the transmission timing control means delays the timing of next light transmission, after an official light transmission period has elapsed since the previous timing of light transmission, until the second level judging means judges that the polarity of the level of the reception signal is changing in such a direction that it is becoming opposite to the polarity of a reception signal corresponding to a normal light pulse transmitted from the sensor itself. Such second level judging means may be structured so as to comprise a comparator for detecting the appearance of a reception signal exceeding a specified threshold value having the same polarity as the polarity of a normal reception signal corresponding to normal pulse light transmitted from the sensor itself and a "back detector circuit" for detecting the back end position of such an output signal outputted from the comparator when it is detecting the appearance of such a reception signal. Then, the transmission timing control means delays the timing of the next light transmission until the back end position of the output signal from the comparator is detected by the back detector circuit.

With a photoelectric sensor thus structured according to the second embodiment of the invention, transmission of pulsed light takes place on the condition that the level of the reception signal is determined to be changing in the direction such that its polarity is becoming the same as that of a normal reception signal corresponding to normal pulsed light from the sensor itself. Thus, the appearance of a noise output exceeding the threshold value near the AC zero during the period for judging the level of reception signal (such as while the sampling gate is left open) can be dependably avoided. In this manner, the period for judging the level of reception signal may be set somewhat longer. The transmission timing control means may preferably be so set as to generate a light transmission timing signal for the next light transmission immediately after a preset wait period after an official light transmission period has elapsed since the previous timing of light transmission, if the second level judging means does not judge that the polarity of the level of the reception signal is changing in the direction of becoming opposite to the polarity of a normal reception signal corresponding to normal light transmitted from the sensor itself. For this purpose, the transmission timing control means may include a timer which starts counting time selectively when an official light transmission period has passed or when a back end position of the output signal from the comparator is detected by the back detector circuit and generates a light transmission timing signal for the next light transmission when a specified period of time has elapsed. When such a light transmission timing signal is generated, the sensor transmits the next light pulse immediately.

There may be situations where the direction of change towards opposite polarity fails to be detected, for example, because of the disappearance of noise such that the delaying of the next light transmission is inadvertently continued. With a photoelectric sensor structured as described above, such a situation can be avoided because a minimum period of light transmission is assured.

According to a third embodiment of the invention, the transmission timing control means delays the timing of next light transmission, after an official light transmission period has elapsed since the previous timing of light transmission, until the second level judging means judges that the polarity of the level of the reception signal is changing in a direction of becoming the same as or opposite to the polarity of a normal reception signal corresponding to a normal light pulse transmitted from the sensor itself. Thus, unlike the second embodiment of the invention described above, light transmission takes place whether or not the polarity of the level of the reception signal is changing in the direction of becoming the same as that of a normal reception signal and hence light transmission can take place more quickly with a shorter wait period although errors due to noise can be avoided less dependably than by the second embodiment.

The second level judging means according to the third embodiment may be structured so as to comprise two (first and second) comparators respectively for detecting appearance of a reception signal exceeding a first or second threshold value having the same polarity as or opposite polarity to that of a normal reception signal corresponding to normal pulse light transmitted from the sensor itself and two (first and second) back detector circuits respectively for detecting the back end position of an output signal outputted from the first or second comparator in response to the appearance of a reception signal exceeding the first or second threshold. The transmission timing control means delays the timing of the next light transmission until the back end position of the output signal from either of the comparators is detected by corresponding one of the back detector circuits.

According to a fourth embodiment of the invention, the transmission timing control means is operable selectably in a first operating mode or a second operating mode. In the first operating mode, the transmission timing control means delays the timing of next light transmission, after an official light transmission period has elapsed since the previous timing of light transmission, until the second level judging means judges that the polarity of the level of the reception signal is changing in a direction of becoming opposite to the polarity of a normal reception signal corresponding to a normal light pulse transmitted from the sensor itself. In the second operating mode, the transmission timing control means causes light transmission immediately after an official light transmission period has elapsed since the previous timing of light transmission or thereafter by waiting for a specified length of time.

A photoelectric sensor thus structured according to the fourth embodiment of the invention is convenient because it can be operated in a suitable manner, depending on the environmental conditions in which it is installed. In the presence of a noise light with periodically varying brightness such as the light from an inverter type fluorescent lamp, the effect of the second embodiment can be obtained by operating in the first mode. Where there is another sensor in the vicinity and light transmitted from such a neighboring sensor may also be received although there is no periodically appearing noise present in the environment, such mutual interference can be avoided by selecting the second mode of operation.

Thus, it is preferable to provide a noise detector means for detecting noise light and electromagnetic noise waves of the type causing a reception signal which will vary periodically and have an AC waveform. With such noise detector means provided, the first mode may be selected if the presence of such periodically changing noise light or electromagnetic noise waves are detected. The second mode may be selected in the absence of such noise. The switching between the two modes of operation may be effected manually by means of a switch dedicated to this purpose.

One of the methods of judging the presence or absence of noise light and/or electromagnetic noise waves is to compare the level of reception signal with a specified threshold value. Another method is by determining whether or not the level of the reception signal remains nearly at an AC zero level over a specified length of time shorter than the official light transmitting time. These methods, however, are not intended to limit the scope of the invention.

A photoelectric sensor according to the fourth embodiment of the invention may comprise time measuring means for measuring time during which the level of a reception signal continuously remains nearly at an AC zero level for a specified length of time shorter than the official light transmitting period and mode switching means for switching to the second mode if the time measured by the time measuring means exceeds the specified length of time and to the first mode if the time measured by the time measuring means is shorter than the specified length of time. With a sensor thus structured, the operating modes can be switched, depending on the presence or absence of noise light or electromagnetic noise waves.

A photoelectric sensor as described above may be formed by using a semiconductor integrated circuit. Such a semiconductor integrated circuit according to this invention may be characterized as comprising a first external terminal for supplying power, a second external terminal for outputting a transmission controlling signal for a driver circuit for the light transmitting element of the sensor, a third external terminal for outputting a sensor load controlling signal for a driver circuit for sensor load, a power source circuit for receiving power through the first external terminal and providing a stabilized power source for internal circuits of the integrated circuit, a light receiving circuit for outputting a reception signal according to light received by the light receiving element of the sensor, a light transmitting circuit for outputting the transmission controlling signal to the second external terminal, an output circuit for outputting the sensor load controlling signal to the third external terminal and a signal processor circuit for controlling the output circuit and the light transmitting circuit by the reception signal received from the light receiving circuit. The light receiving circuit, the light transmitting circuit, the output circuit and the signal processor circuit are integrated, and the signal processor circuit comprises a first level judging means for comparing the reception signal with a specified threshold value at a timing slightly delayed from the timing of light transmission from the light transmitting element, a signal processing means for generating a sensor output according to a result of comparison by the first level judging means and supplying the sensor output to the output circuit, a second level judging means for comparing the reception signal with another threshold value near an AC zero level, and a light transmission timing controlling means for supplying to said light transmitting circuit a light transmission timing control signal for controlling the timing of next light transmission from the light transmitting element according to the comparison by the second level judging means.

In the above, "sensor load" includes various devices which are electrically connected to the sensor and controlled on the basis of outputs from the sensor. Examples of the sensor load include input units of a programmable logic controller. Examples of their driving circuit include switching transistors and triacs. By using such a semiconductor integrated circuit, the sensor as a whole can be made smaller and the production cost can be reduced.

With an integrated circuit as described above, too, various functions as described above can be provided. For example, the light transmission timing controlling means may delay the timing of the next light transmission until the level of the reception signal according to the second level judging means becomes close to an AC zero level after an official light transmitting period. The light transmission timing controlling means may delay the timing of the next light transmission until the level of the reception signal is determined by the second level judging means to be changing in the direction of having the opposite polarity to that of a normal reception signal corresponding to a normal pulse transmitted from the light transmitting element. The light transmission timing controlling means may cause the next light transmission from the light transmitting element immediately after waiting for a specified length of time since the previous transmission of light from the light transmitting element.

The signal processor circuit may be made selectably operable in a first mode and a second mode where the first mode is wherein the timing of the next light transmission is delayed until it is determined by the second level judging means that the level of the reception signal is changing in a direction of having the opposite polarity to that of a normal reception signal corresponding to a normal pulse transmitted from the light transmitting element, and the second mode is wherein the next light transmission is caused immediately after a specified length of time since the previous transmission of light from the light transmitting element. A noise detecting means may be further provided for detecting the presence or absence of periodically changing noise light or electromagnetic noise waves having an AC waveform and selecting the first or second mode accordingly. The judgment of such presence or absence may be effected by comparing the reception signal level with a specified threshold or by checking whether the reception signal level remains nearly equal to an AC zero level over a specified length of time.

DETAILED DESCRIPTION OF THE INVENTION

The invention is described next by way of an example of a photoelectric sensor embodying this invention. A method of controlling such a sensor will be described at the same time. Although the example shows a sensor with its light transmitter and receiver contained in a same housing structure, this is not intended to limit the scope of the invention. As long as the operations of the light transmitter and receiver can be correlated (or synchronized), they may be contained in separate housing structures. It is also to be noted that the sensor according to this invention includes all kinds of sensors using light pulses, inclusive of sensors for detecting the presence or absence of a target object as well as the distance to the target object, its size and characteristics.

Figure 1:
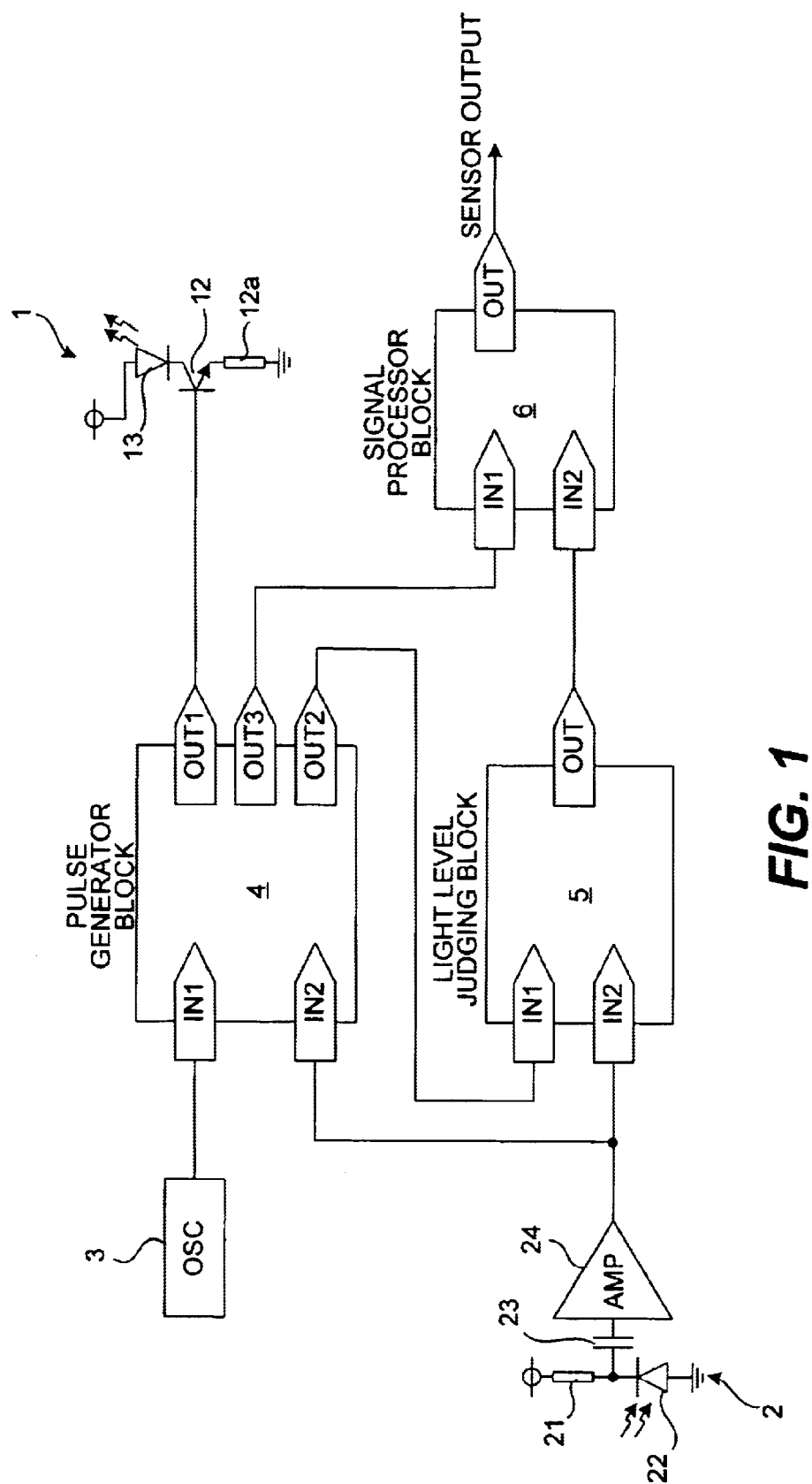
FIG. 1 is a block diagram of a photoelectric sensor embodying this invention to show its overall structure.

As shown in FIG. 1, the sensor according to a first embodiment of this invention is comprised of a light transmitter 1, a light receiver 2, an oscillator (OSC) 3, a pulse generator block 4 having two input terminals IN1 and IN2 and three output terminals OUT1–3, a light level judging block 5 having two input terminals IN1 and IN2 and one output terminal OUT, and a signal processor block 6 having two input terminals IN1 and IN2 and one output terminal OUT.

The light transmitter 1 includes a driver circuit 12 which is operated by a driver pulse outputted from output terminal OUT1 of the pulse generator block 4 (shown in FIG. 1 as a grounded emitter transistor having an emitter resistance 12a) and a light emitting element 13 driven by this driver circuit 12 (shown in FIG. 1 as a light emitting diode adapted to emit infrared or visible light). Pulsed light is emitted from the light emitting element 13 to a target area for detection in synchronism with the driver pulse outputted from output terminal OUT1 of the pulse generator block 4.

The light receiver 2 functions as a photoelectric converter for converting light pulses received from the target area of detection into an electrical pulse, being comprised of a resistor 21 and a photodiode 22 connected in series between a power source and the ground, a connector capacitor 23 for taking out the variations in the voltage at their junction, and an amplifier circuit AMP 24 for amplifying and outputting the signal outputted from the connector capacitor 23. The electrical signal thus outputted from the amplifier circuit 24 in response to light received by the light receiver 2 is hereinafter referred to as the "reception signal" and is supplied to input terminal IN2 of the pulse generator block 4 and input terminal IN2 of the light level judging block 5.

The oscillator 3 serves to output a clock pulse at a specified frequency. This clock pulse is supplied to input terminal IN1 of the pulse generator block 4. According to this example, the clock pulse is outputted from the oscillator 3 at intervals of about 0.625 $\mu$s. It is so set that light is emitted at the rate of once per 160 counts×0.625 $\mu$s=100 $\mu$s (so-called official light transmission period) unless the counter is stopped (as will be explained below).

The pulse generator block 4 generates three different kinds of control pulses on the basis of the clock pulse inputted from input terminal IN1 and the reception signal inputted from input terminal IN2 and outputs them through the three output terminals OUT1–3. One of the control signals is referred to as the "light transmission timing pulse" and is for specifying the timing of light transmission from the light transmitter 1 and is supplied from output terminal OUT1 to the driver circuit 12 of the light transmitter 1. Another of the control signals is referred to as the "gate opening timing pulse" and is for specifying the light level judgment timing (or the timing for opening the sampling gate according to this example). This pulse is supplied through output terminal OUT2 to input terminal IN1 of the light level judging block 5. The third of the control signals is referred to as the "take-in timing pulse" and is for specifying the timing for taking in signals into the signal processor block 6. This pulse is supplied through output terminal OUT3 to input terminal IN1 of the signal processor block 6. A more detailed description of the pulse generator block 4 will be presented below.

The light level judging block 5 serves to open the sampling gate in synchronism with the gate opening timing pulse inputted from input terminal IN1, to compare the reception signal then received through input terminal IN2 with a specified threshold value and to generate and output a judgment signal indicative of presence or absence of received light.

Figure 2A:
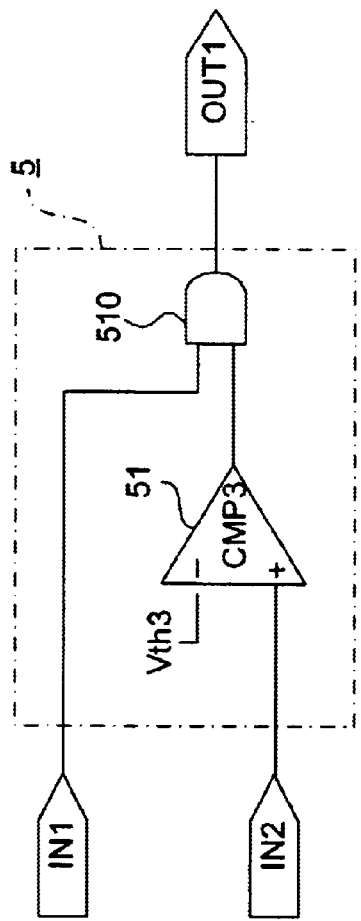
FIG. 2A is a block diagram of the light level judging block and FIG. 2B is a block diagram of the signal processor block of FIG. 1.

As shown in FIG. 2A, the light level judging block 5 includes a comparator 51 (CMP3) having a non-inversion input terminal (+) and an inversion input terminal (−) and an AND circuit 510 for calculating a logical product of the input from input terminal IN1 (gate opening timing pulse) and the output from the comparator 51. The signal from input terminal IN2 (that is, the reception signal V from the light receiver 2) is inputted to the non-inversion input terminal (+) of the comparator 51, while a comparison threshold value Vth3 is inputted to its inversion input terminal (−). In summary, the light level judging block 5 carries out a binary operation on the basis of the comparison between the reception signal V and the threshold value Vth3, generates a judgment signal "H" for presence of received light and "L" for absence of received light and outputs it through output terminal OUT to input terminal IN2 of the signal processor block 6. In this example, the threshold value Vth3 is set equal to about 55 mV with regard to the relationship with the peak value of a known reception signal based on the pulse transmitted by the sensor itself.

Figure 2B:
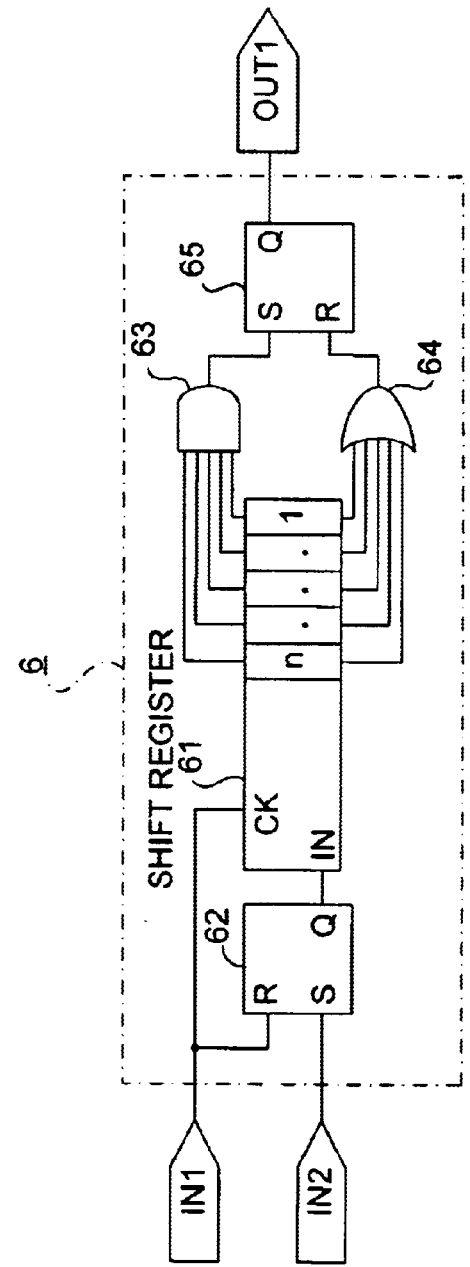

The signal processor block 6 functions as a digital low pass filter and includes, as shown in FIG. 2B, an n-stage (such as 8-stage) shift register 61 having data input terminal IN and a clock input terminal CK, a (first) RS flip-flop 62 which is set by the rise of the judgment signal "H" inputted through input terminal IN2 and reset by the rise of the take-in timing pulse "H" inputted from input terminal IN1, an AND gate 63 for obtaining the logical product of the logical sums of the outputs from the stages of the register 61, a NOR gate for obtaining the inverted logical sums of the outputs from the stages of the register 61 and another (second) RS flip-flop 65 which is set by the rise of "H" of the output from the AND gate 63 and reset by the rise of "H" of the output of the NOR gate 64.

The take-in timing pulse from input IN1 is inputted to the clock input terminal CK of the shift register 61. Thus, shifting takes place in the signal processor block 6 on the basis of the take-in timing pulse, and the judgment signals "H" and "L" inputted from input terminal IN2 are taken into the first stage of the shift register 61 through the first RS flip-flop 62 while each stage of the shift register 61 is sequentially shifted to the next stage. While the sampling gate of the light level judging block 5 is open, the first flip-flop 62 serves to hold the output "H" from output terminal OUT. In other words, if "H" is outputted even once as the judgment signal while the sampling gate is open before signals are taken into the shift register 61, "H" is inputted to the shift register 61.

The input timing of pulse from input terminal IN1 to the reset terminal R of the first RS flip-flop (or the reset timing of the flip-flop 62) must be slightly delayed from that of the pulse from the same input terminal IN1 to the clock input terminal CK of the shift register 61. For this reason, a delay circuit or the like is actually inserted between input terminal IN1 and the RS flip-flop 62, although it is not shown in the figure for the sake of simplifying the disclosure.

The output from the AND gate 63 becomes "H" when each of the stages of the shift register 61 is "1", indicating "H", and the second flip-flop 65 becomes set at the rise of this "H". At this moment, the output from the second flip-flop 65, which is the sensor output in this example, is "H", indicating that the pulse transmitted by the sensor itself has been normally received. If each stage of the shift register 61 is "0", indicating "L", on the other hand, the Q output of the NOR gate 64 becomes "H", and the second flip-flop 65 comes to be in the reset condition. The second flip-flop 65 stays in this reset condition until a set input is received from the AND gate 63.

Thus, according to the first embodiment of this invention, the light receiver 2 is provided with a digital low pass filter adapted to output "H" only when a specified number of light pulses have been received continuously. Once "H" is outputted, this continues until every stage of the shift register 61 becomes "0".

Figure 3:
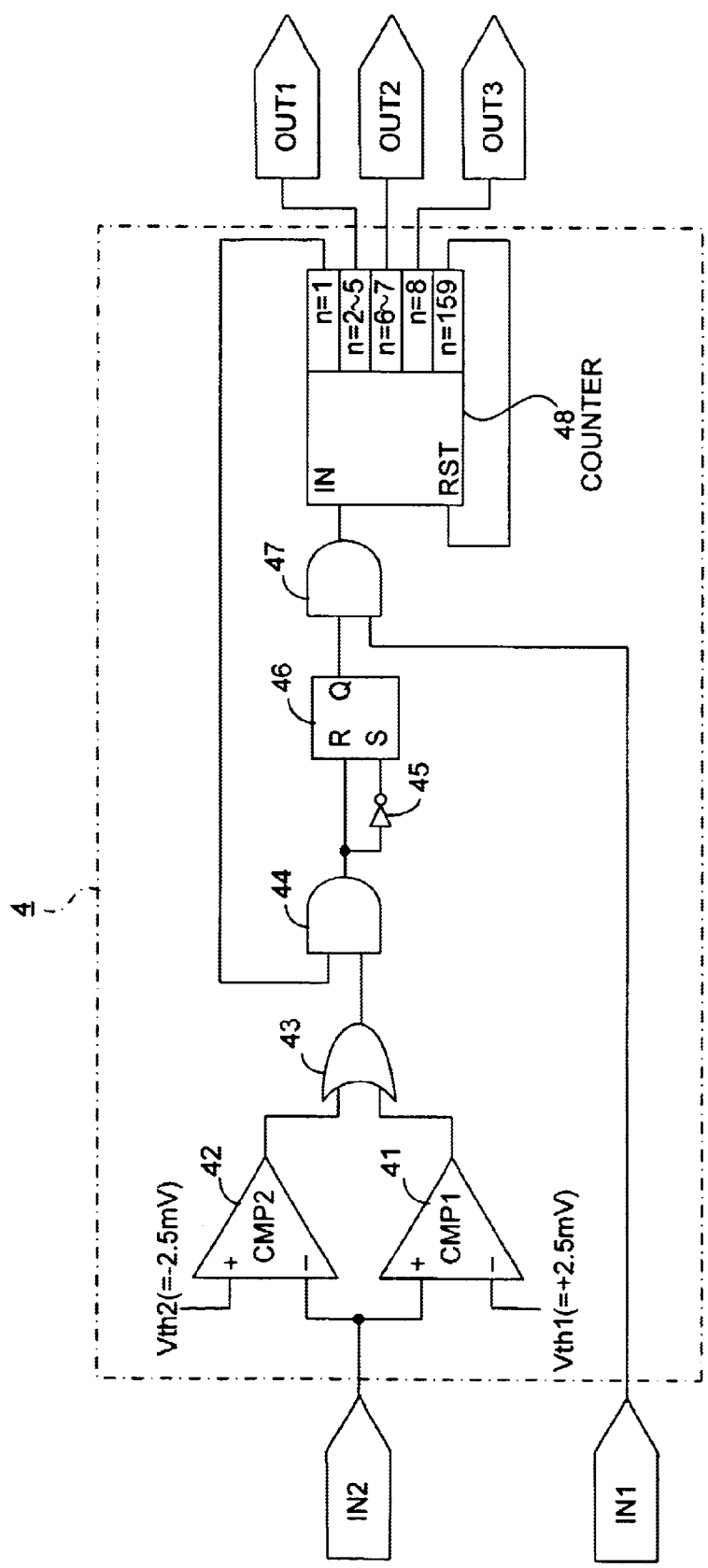
FIG. 3 is a circuit diagram of the pulse generator block of FIG. 1 according to a first embodiment of the invention.

As shown more in detail in FIG. 3, the pulse generator block 4 includes a counter 48 which has a data input terminal IN and a reset signal input terminal RST and serves to count up a number n (n=0–159), a pair of comparators 41 (CMP1) and 42 (CMP2) provided in parallel on the output side of the input terminal IN2, an OR gate 43 for obtaining a logical sum of the outputs from these two comparators, an AND gate 44 for obtaining a logical product of the pulse output generated when the counter 48 counts "1" and the output from the OR gate 43, a NOT gate 45 for inverting the output from the AND gate 44, a RS flip-flop 46 which is set by the rise of "H" of the output from the NOT gate 45 (or "L" of the output of the AND gate 44) and reset by the rise of "H" of the output from the AND gate, and another AND 47 gate for obtaining the logical product of the output from the RS flip-flop 46 and the input from the input terminal IN1 (or the clock pulse).

The counter 48 serves to increment the count number n sequentially by the clock pulses inputted to the data input terminal IN from the AND gate 47 and to output various pulses on the basis of the count number n for controlling the transmission and reception of light as explained above, inclusive of the three kinds of control pulses OUT1–OUT3. Explained more in detail, when n=1 (at the "noise check timing"), the clock pulse is outputted to the AND gate 44. When n=2–5, the light transmission timing pulses are outputted to the light transmitter 1 from output terminal OUT1, thereby causing light pulses to be outputted from the light transmitter 1. When n=6–7, the gate opening timing pulses are transmitted from output terminal OUT2 to the light level judging block 5. When the count number is n=8, the take-in timing pulse is transmitted from output terminal OUT3 to the signal processor block 6. When the count number is n=159, a reset pulse is outputted to its own reset signal input terminal RST, resetting the count number n to "0". FIG. 3 does not show n=0 in the counter 48.

As can be understood from the figure, since the clock pulse from input terminal IN1 is inputted through the AND gate 47 to input terminal IN of the counter 48 when the RS flip-flop 46 is in the set condition (Q="H"), the count number is increased by +1 by the clock pulse from the input terminal IN1. When the RS flip-flop 46 is in the reset condition (Q="L"), on the other hand, the output of the AND gate 47 is "L" and hence the clock pulse cannot pass the AND gate 47, the incrementing of the count number n being stopped until the RS flip-flop 46 is again in the set condition.

The AND gate 44 outputs "H" only if the output from the OR gate 43 is "H" at the arrival of the noise check timing (or when n=1). The RS flip-flop 46 is reset by the rise of the "H" of the output from the AND gate 44, its output is inverted by the NOT gate 45 when the output from the AND gate 44 is "L" and it is set by the rise of the "H". Thus, the RS flip-flop 46 is reset at the arrival of the noise check timing only if the output of the OR gate 43 is "H". Accordingly, the incrementing of the count number n stops only when n=1 and the output from the OR gate 43 is "H". Since the output from the OR gate 43 becomes "L" only if the outputs from the two comparators 41 and 42 are both "L", the count number n stops being incremented only when n=1 and the output from either of the two comparators 41 and 42 is "H".

The two comparators 41 and 42 are for constantly monitoring the light being received on the basis of the value of the reception signal V received from input terminal IN2. The reception signal value V from input terminal IN1 is inputted to the non-inversion input terminal (+) of the first comparator 41 and a threshold value Vth1 for reference is inputted to its inversion input terminal (−). Thus, the output from the first comparator 41 is "H" if V≧Vth1 and is "L" if V<Vth1. This threshold value Vth1 is of the positive polarity near the AC zero level and it may be set equal to about +25 mV.

The reception signal value V is also inputted to the inversion input terminal (−) of the second comparator 42 and another threshold value Vth2 for reference is inputted to the non-inversion input terminal (+). Thus, the output from the second comparator 42 is "L" if V>Vth2 and is "H" if V≦Vth2. This threshold value Vth2 is of the negative polarity near the AC zero level and it may be set equal to about −25 mV. Thus, the output from the OR gate 43 is "L" only if Vth2<V<Vth1.

Accordingly, with the pulse generator block 4 thus structured, if the value of the reception signal V at the noise check timing (which is immediately before the transmission of light according to this example or when a light pulse from the sensor itself is not being transmitted) is not within the output region near zero sandwiched between Vth1 and Vth2, the count number n remains n=1 until V comes to satisfy the inequality Vth2<V<Vth1. Thus, the light transmission timing pulse from output terminal OUT1 is delayed until the value of the reception signal V again comes to satisfy the inequality Vth2<V<Vth1.

Figure 4:
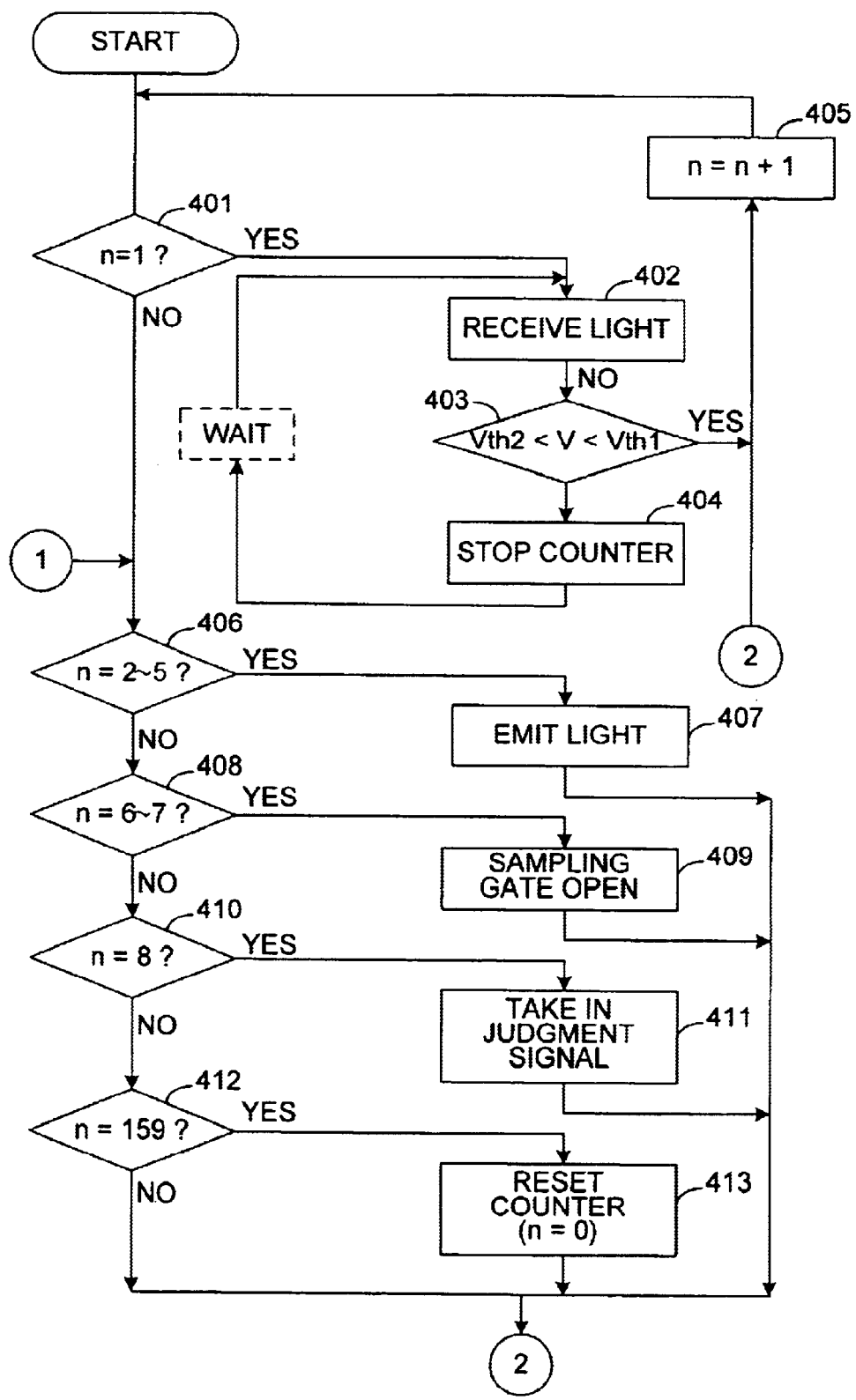
FIG. 4 is a flowchart of the operations of the pulse generator block shown in FIG. 3.

FIG. 4 is a flowchart of the operations of the pulse generator block 4 structured as described above. This flowchart may be regarded also as representing the software processing of the pulse generator block 4 by means of a microcomputer.

When the count number n by the counter 48 is 1, indicating the arrival of the noise check timing (YES in Step 401), the value of the reception signal V in the presence of noise light is checked through the comparators CMP1 and CMP2 (Step 402). If Vth2<V<Vth1 (YES in Step 403), the count number n is increased by +1 (Step 405) to become n=2, and the program proceeds to Step 406. If V≦Vth2 or V≧Vth1 (NO in Step 403), on the other hand, the count number n is kept such that n=1 until V comes to satisfy the condition Vth2<V<Vth1.

When n=2–5 (YES in Step 406), a light transmission timing pulse is outputted from output terminal OUT1, causing pulsed light to be transmitted from the light transmitter 1 (Step 407). Each time a light transmission timing pulse is outputted, the count number n is increased by +1 (Step 405) until it becomes 6. Four light pulses are then emitted over a period of about 2.5 µs (4×0.625 µs).

When the count number n is 6 or 7 (YES in Step 408), a gate opening timing pulse is outputted from output terminal OUT2 (Step 409) such that the sampling gate in the light level judging block 5 is opened and the level of the reception signal supplied to input terminal IN2 at that time is identified, causing a judgment signal to be generated and outputted so as to indicate whether or not light has normally been received. Once a gate opening timing pulse is outputted, the count number n is increased by +1 (Step 405) and the cycle of Steps 408, 409 and 405 is repeated until n becomes 8.

When the count number n becomes 8 (Yes in Step 410), a take-in timing pulse is outputted from output terminal OUT3 (Step 411). In response, the signal processor block 6 inputs a judgment signal ("H" or "L" indicative of presence or absence of received light) inputted from input terminal IN2 into the first stage of the shift register, causing the content at each stage to be shifted at the same time. In this example, since judgment signals for one stage are obtained for 4 pulses of light transmitted in Step 407, one sensor output "H" or "L" is obtained per 100 µs (official light transmission period)×8 (number of stages).

When the count number n reaches 159 (Yes in Step 412), a reset pulse is generated and inputted to the reset signal input terminal RST of the counter 48 itself. This resets the count number n to zero, and the count number n is thereafter increased again by +1 (Step 405). When the count number n is 9–158, only the incrementing of the count number n by +1 takes place per cycle.

Figure 5:
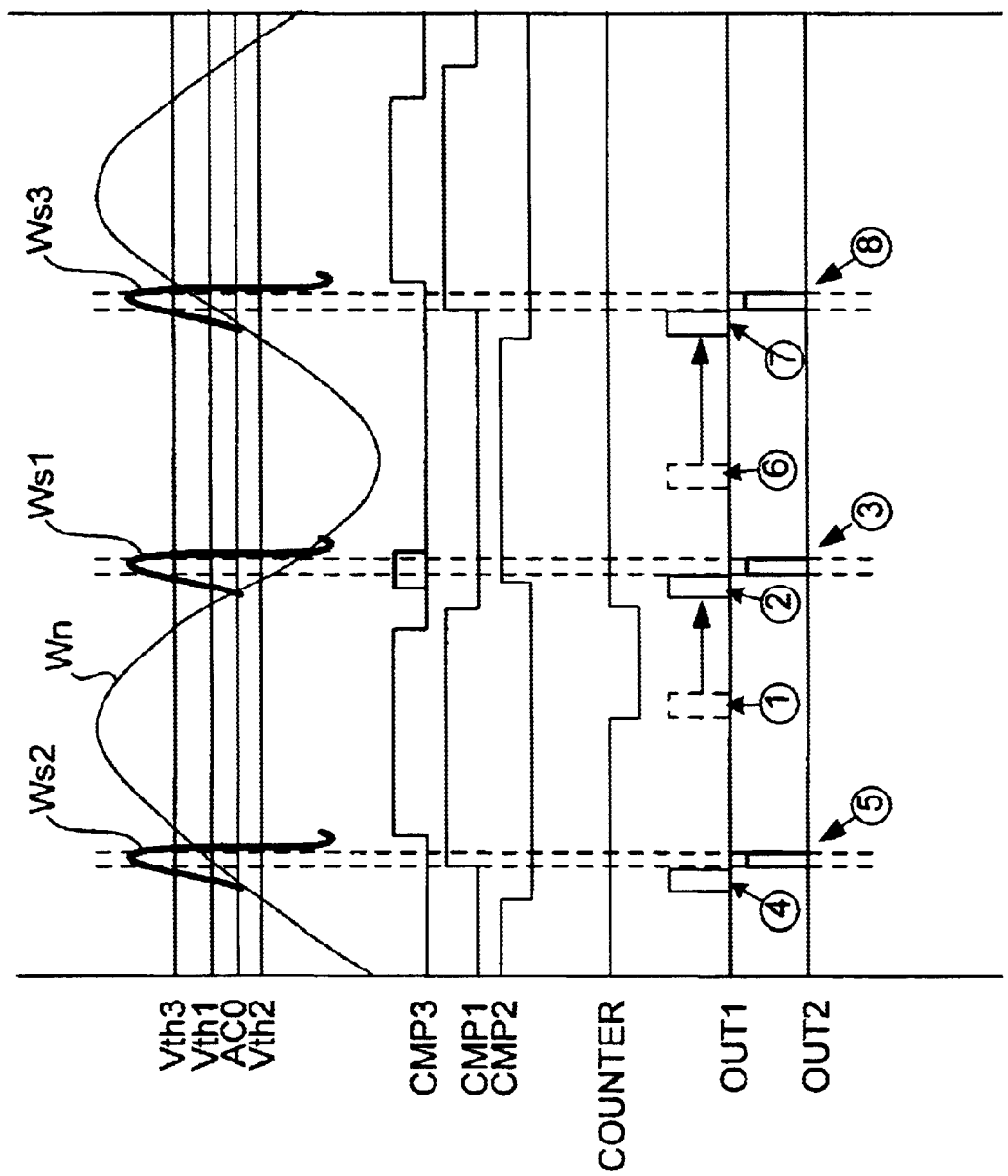
FIG. 5 is a timing chart of the operations of the photoelectric sensor according to the first embodiment of the invention.

Next, the timing chart of FIG. 5 is referenced to explain the operations of the photoelectric sensor structured as described above. On the left-hand side of FIG. 5, Vth3 indicates the detection threshold value Vth3 (55 mV) of the comparator (CMP3) 51 of the light level judging block 5, AC0 indicates its AC zero level, Vth1 indicates the threshold value with positive polarity (+25 mV) of the first comparator (CMP1) 41 of the pulse generator block 4, Vth2 indicates the threshold value with negative polarity (−25 mV) of the second comparator (CMP2) 42 of the pulse generator block 4, CMP3 indicates the output condition of the third comparator CMP3 (based on "H" and "L"), CMP1 is the output from the first comparator (CMP1) 41, CMP2 is the output from the second comparator (CMP2) 42, COUNTER indicates the output from the AND gate 47 of the pulse generator block 4 (or the input to the counter), OUT1 indicates the light transmission timing pulse outputted from output terminal OUT1 of the pulse generator block 4 and OUT2 indicates the gate opening timing pulse outputted from output terminal OUT2 of the pulse generator block 4. Ws (each of Ws1, Ws2 and Ws3) indicates the waveform having a positive peak (with positive polarity) of reception signal based on the light pulse transmitted from the sensor itself, and Wn indicates the AC waveform of reception signal based on noise light from an inverter type fluorescent lamp with frequency 50 kHz. It should be noted that the three waveforms Ws1, Ws2 and Ws3 shown in FIG. 5 are for the purpose of explaining the operations according to the first embodiment of the invention and are not intended to illustrate a realistic manner in which pulses are transmitted from the light transmitter 1.

FIG. 5 shows that the output from the third comparator (CMP3) 51 is "H" as long as the value of the reception signal V is over the threshold value Vth3, independent of whether the reception signal is due to a light pulse transmitted from the sensor itself or due to noise light, that the output from the first comparator (CMP1) 41 is "H" when the reception signal V is over its threshold value Vth1 and that the output from the second comparator (CMP2) 42 is "H" when the reception signal V is below its threshold value Vth2.

If the noise check timing arrives (n=1) at the moment indicated by circled "1" when the reception signal Wn is over the first threshold Vth1, the output from the first comparator (CMP1) 41 is "H", the count value n is not incremented and the output from output terminal OUT1 is "L". When the output level of the waveform of the reception signal Wn becomes lower than the first threshold Vth1 thereafter, the count number n begins to be incremented again at the timing indicated by circled "2". At the same time, the output from output terminal OUT1 becomes "H" and the transmission of light continues (n=2–5). Next, as the output from output terminal OUT2 becomes "H" at the timing shown by circled "3", the sampling gate for received light is opened. Waveform Ws1 indicates that of the light emitted at this time. What is then received will be the sum of Ws and the noise waveform Wn.

If the noise check timing arrives (n=1) as indicated by circled "4", the count number n keeps increasing because the output level of noise waveform Wn at this time is between the threshold values Vth1 and Vth2 such that light transmission takes place immediately and the sampling gate for the received light becomes open as indicated by circled "5". Ws2 shows the signal waveform which appears due to the light transmission from the light transmitter 1 at this time.

If the check noise timing arrives (n=1) as indicated by circled "6", the output from the second comparator (CKP2) 42 is "H" because the output level Wn of the reception signal then is below the negative polarity threshold value Vth2 and the count number n is not incremented. The output from output terminal OUT1 then becomes "L". When the output level Wn of the reception signal crosses the level of the threshold value Vth2 at the timing indicated by circled "7", the increasing of the count number n is resumed, and the output level of output terminal OUT1 becomes "H". The light pulse is accordingly transmitted from the light transmitter 1 (n=2–5). Subsequently at the timing indicated by circled "8", the output level from the output terminal OUT2 becomes "H" and the sampling gate for received light becomes open. Ws3 shows the signal waveform which appears due to the light transmission from the light transmitter 1 at this time.

If there is no noise light Wn (although not separately shown), the output level is nearly zero when the noise check timing arrives and is between Vth1 and Vth2. Thus, the light transmission takes place once every official light transmission period of 100 µs.

Thus, according to the first embodiment of the invention, the emission of light is controlled such that the zero-cross timing of the reception signal Wn with noise light (when Vth2<V<Vth1 in this example) and the timing of opening the sampling gate will match. As a result, the peaks of the reception signal based on the transmitted light from the sensor itself and the reception signal based on noise light will not be superposed such that the effect of noise can be minimized and an accurate detection and judgment can be accomplished.

Figure 6:
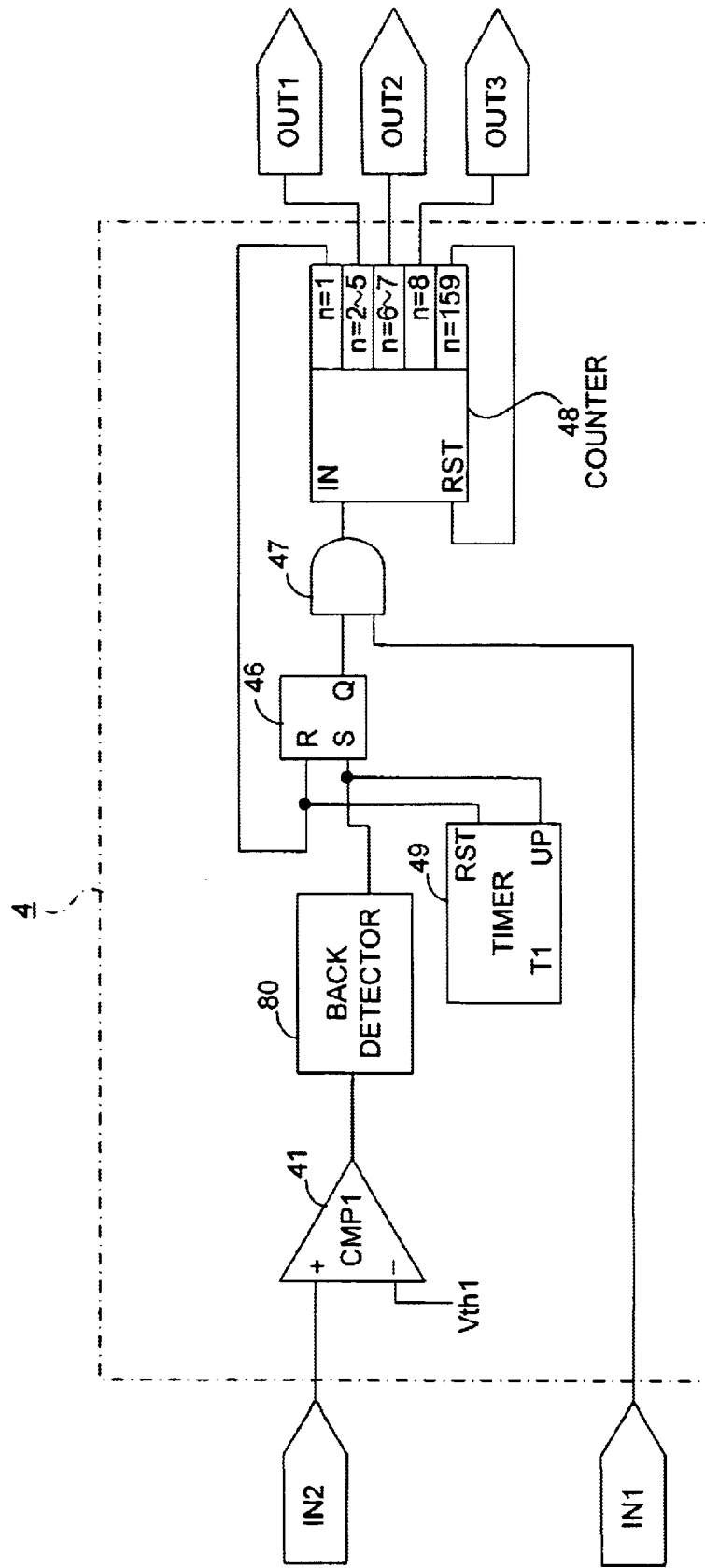
FIG. 6 is a circuit diagram of a pulse generator block according to a second embodiment of the invention.

FIG. 6 shows another pulse generator block according to a second embodiment of the invention. A photoelectric sensor incorporating such a pulse generator block is herein referred to as a sensor according to the second embodiment. The pulse generator according to the second embodiment is in part similar to the one according to the first embodiment described above with reference to FIG. 3. Similar or equivalent components will be indicated by same numerals and will not be repetitiously described. A single comparator (CMP1) 41 is on the output side of input terminal IN2, and a back detector circuit 80 to be explained below is connected to the output side of this comparator 41. The pulse generator block 4 further includes a delay monitoring timer (TIMER) 49 having a reset signal input terminal RST and an output terminal UP and a flip-flop 46 adapted to be set by an output from a back detector circuit 80 or from the timer 49.

The back detector circuit 80 is so referred to because it serves to detect the backward end point of the pulse waveform appearing in the output from the comparator (CMP1) 41, outputting "H" when a back end point has been detected. The delay monitoring timer 49 is for monitoring the passage of time with respect to a delay limit time t for light transmission, beginning to subtract from the delay limit time t when the noise check timing arrives and outputting "H" when the delay limit time t elapses.

The RS flip-flop 46 is reset when the noise check timing arrives (when n=1) and is set thereafter when the back detector circuit 80 detects the end point or the delay limit time t has elapsed without the back end point having been detected by the back detector circuit 80. In summary, since the count number n remains at the same value without being incremented after the arrival of the noise check timing until a next back position is detected, the transmission of light is thereby delayed. If no back end position is detected, the incrementing of the count number n is resumed after the elapse of a delay limit time t, and the light transmitter 1 begins to resume transmission of pulsed light.

According to an example, the delay limit time t is set longer than the official light transmission period of 100 μs, such as 200 μs. If the incrementing of the count number n is not stopped, four pulses are emitted per official light transmission period of 160 counts×0.625 μs=100 μs, as explained above with reference to the first embodiment of the invention. In other words, according to the second embodiment of the invention, light is transmitted at least once every 300 μs.

Figure 7:
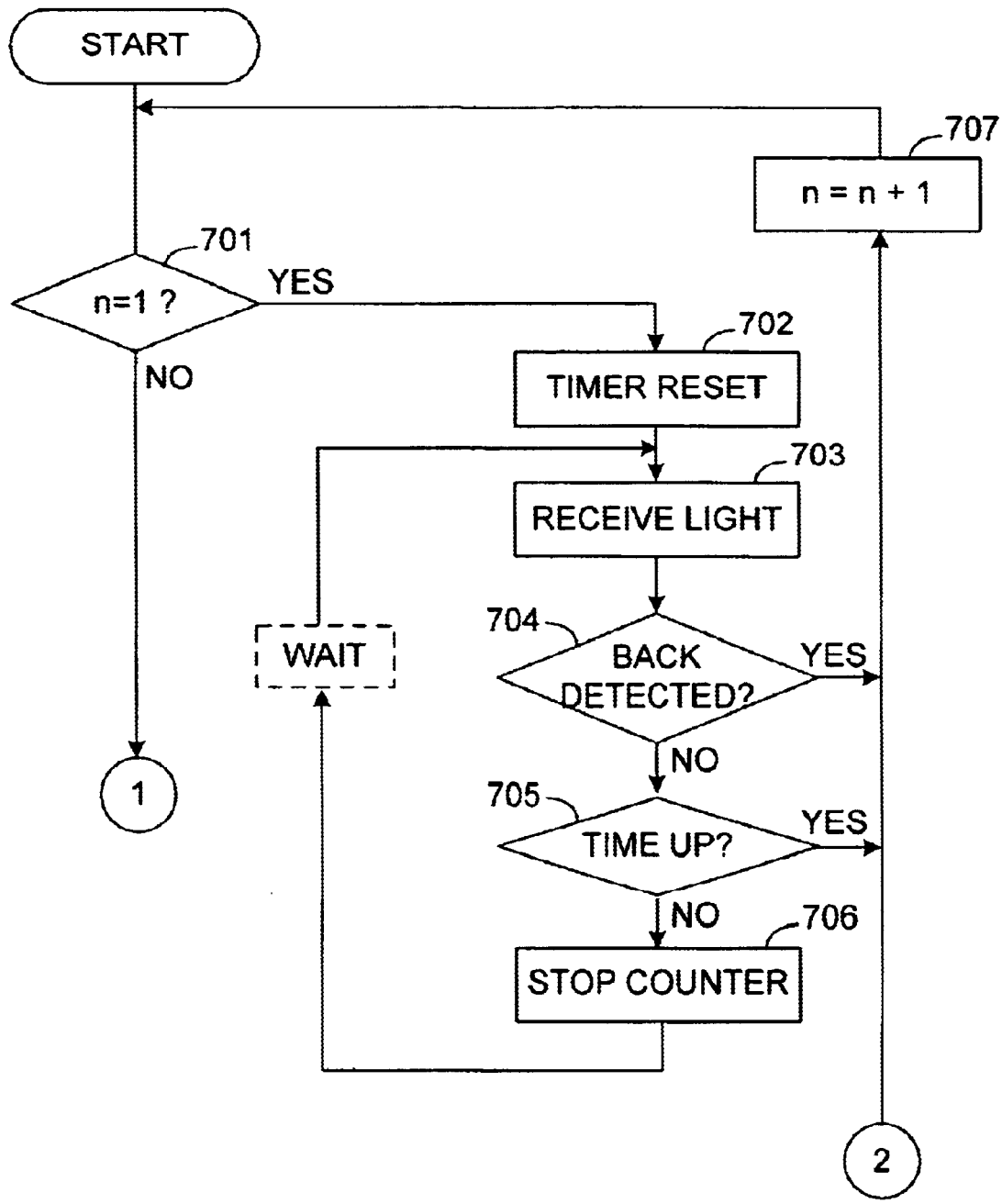
FIG. 7 is a flowchart of the operations of the pulse generator block shown in FIG. 6.

FIG. 7 is referenced next to explain the operations of the pulse generator block 4 according to the second embodiment. As explained above, this may be interpreted also as representing the software processing of the block by a microcomputer.

When the count number n is 1 to indicate that it is the noise check timing (YES in Step 701), the delay monitoring timer T1 is reset and the subtraction from the delay limit time t is started (Step 702). At the same time, the comparator (CMP1) 41 and the back detector circuit 80 check whether the value V of the reception signal is immediately before crossing the AC zero level (Step 703). If a back end position has been detected (YES in Step 704), the count number n is incremented by +1 (Step 707) such that n=2 and the program proceeds to Step 406 in the flowchart of FIG. 4. If no back end position is detected (NO in Step 704), the incrementing of the count number n is stopped (Step 706) until a back end position is detected (YES in Step 704) or a specified delay limit time t has elapsed (Yes in Step 705). When the incrementing of the count number n is started, Steps 406–413 shown in the flowchart of FIG. 4 are repeated.

Figure 8:
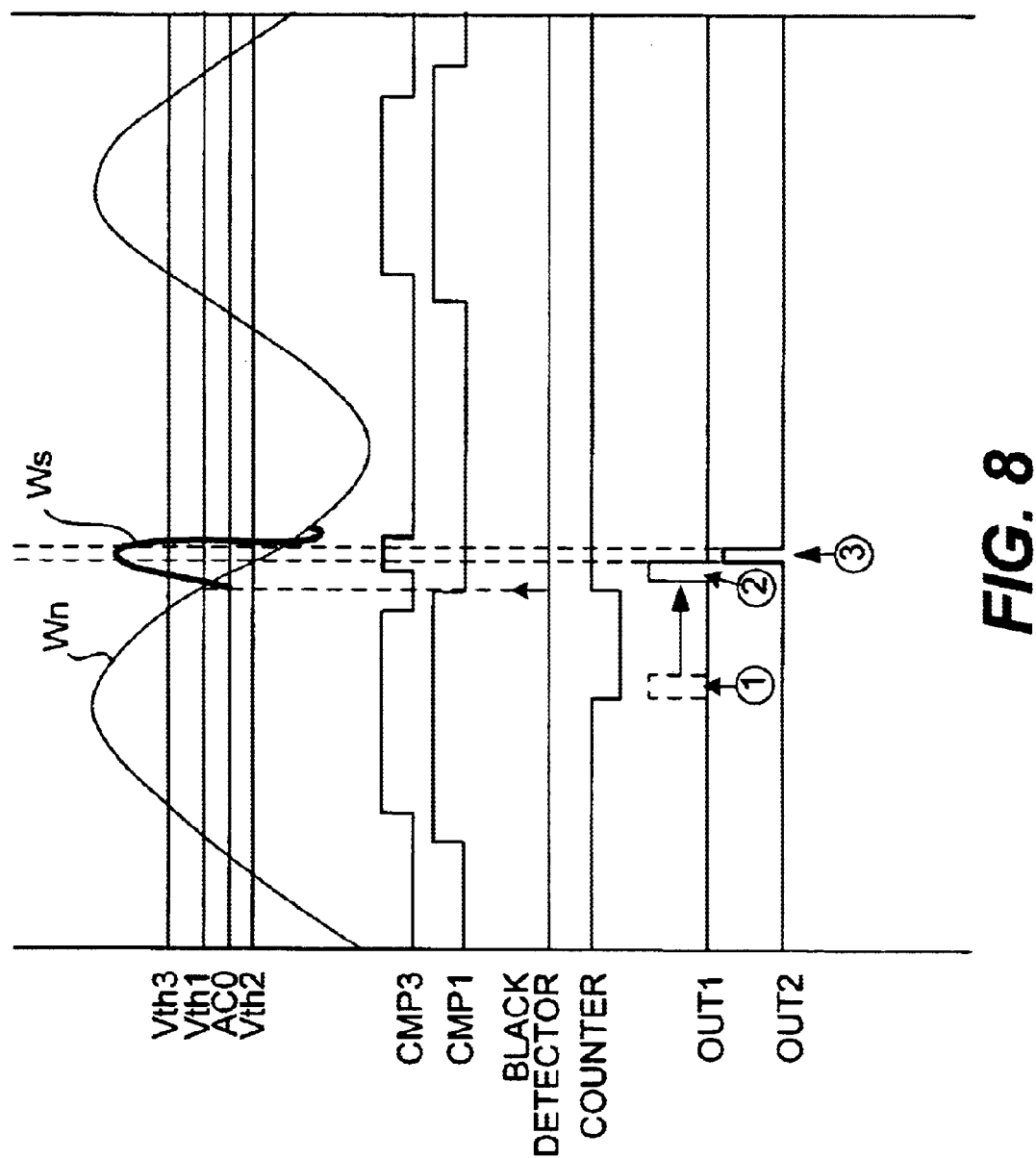
FIG. 8 is a timing chart of the operations of the photoelectric sensor according to the second embodiment of the invention.

The timing chart of FIG. 8 is referenced next to explain the operations of the pulse generator block 4 according to the second embodiment shown in FIG. 6. On the left-hand side of the figure, Vth3 indicates the detection threshold value (55 mV) of the third comparator (CMP3) 51 of the light level judging block 5, AC0 again indicates the AC zero level, Vth1 indicates the threshold value of positive polarity (+25 mV) of the comparator (COMP1) 41 of the pulse generator block 4, CMP3 indicates the output from the third comparator (CMP3) 51, CMP1 indicates the output from the comparator (CMP1) 41, COUNTER indicates the output from the AND gate 47 of the pulse generator block 4 (or the input to the counter), OUT1 indicates the outputted light transmission timing pulse from output terminal OUT1 of the pulse generator block 4, and OUT2 indicates the outputted gate opening timing pulse from output terminal OUT2 of the pulse generator block 4. Ws indicates the waveform of reception signal based on the light transmission from the sensor itself and Wn indicates the waveform of reception signal based on noise light from an inverter type fluorescent lamp with frequency 50 kHz.

FIG. 8 shows that the output from the third comparator (CMP3) 51 is "H" as long as the value of the reception signal V is over the threshold value Vth3, independent of whether the reception signal is due to a light pulse transmitted from the sensor itself or due to noise light, and that the output from the comparator (CMP1) 41 is "H" when the reception signal V is over its threshold value Vth1.

If the noise check timing arrives (n=1) at the moment indicated by circled "1" in FIG. 8 when the reception signal Wn is over the threshold Vth1, the output from the comparator (CMP1) 41 is "H" and hence the increase of the count value n is stopped and the output from output terminal OUT1 is "L". When the output level of the waveform of the reception signal Wn becomes lower than the first threshold value Vth1 thereafter, that is, when a back point in the pulse waveform based on the output from the comparator (CMP1) 41 is detected, the count number n begins to be incremented again at the timing indicated by circled "2" and transmission of light continues (n=2–5). Still thereafter at the timing indicated by circled "3", the output from output terminal OUT2 becomes "H" and the sampling gate is opened.

If there is no noise light Wn (although not separately shown), the output level of the comparator (CMP1) 41 is always zero. Thus, the back position is not detected and the transmission of light from the light transmitter 1 is not triggered by the detection of a back end point. In this case, however, the delay monitoring timer 49 functions every 200 μs after the arrival of a noise check timing (once every 100 μs) and hence emission of light can take place once every 300 μs.

In this case, the timing for the opening of the sampling gate is nearly the same as the peak position on the received light waveform based on the transmission of light from the sensor itself and the zero-cross timing of the received light waveform based on noise light. In other words, according to the second embodiment of the invention, the timing immediately before the output due to noise light crosses the AC zero level is detected on the basis of the threshold value Vth1 and the timing for transmission of light are synchronized such that the timing for the appearance of a peak of the received light waveform based on the transmitted light from the sensor itself is matched to the zero-cross timing of the received light waveform based on noise light.

According to the second embodiment of the invention, therefore, the zero-cross timing and the timing of the sampling gate opening can be more accurately synchronized than according to the first embodiment of the invention described above. Since this zero-cross timing appears when the polarity of the reception signal waveform Wn based on noise light is switching to be opposite to the polarity of the reception signal waveform Ws based on the light pulse emitted by itself, the peaks of the waveforms Wn and Ws are not superposed with the same polarity even where high-frequency noise is appearing on the output line for received light.

Although an example has been shown wherein light transmission is started when, or immediately after, the output level of the received light waveform Wn becomes lower than the threshold value Vth1 with positive polarity, or wherein the zero-cross timing was selected when the polarity of the reception signal waveform Wn based on noise light changes to the polarity which is opposite to that of the reception signal waveform Wn based on the pulse light emitted by itself, the zero-cross timing may be selected at a timing when the polarity of the reception signal waveform Wn with noise light is changing to the same polarity as that of the reception signal waveform Ws based on transmitted light from the sensor itself.

Figure 9:
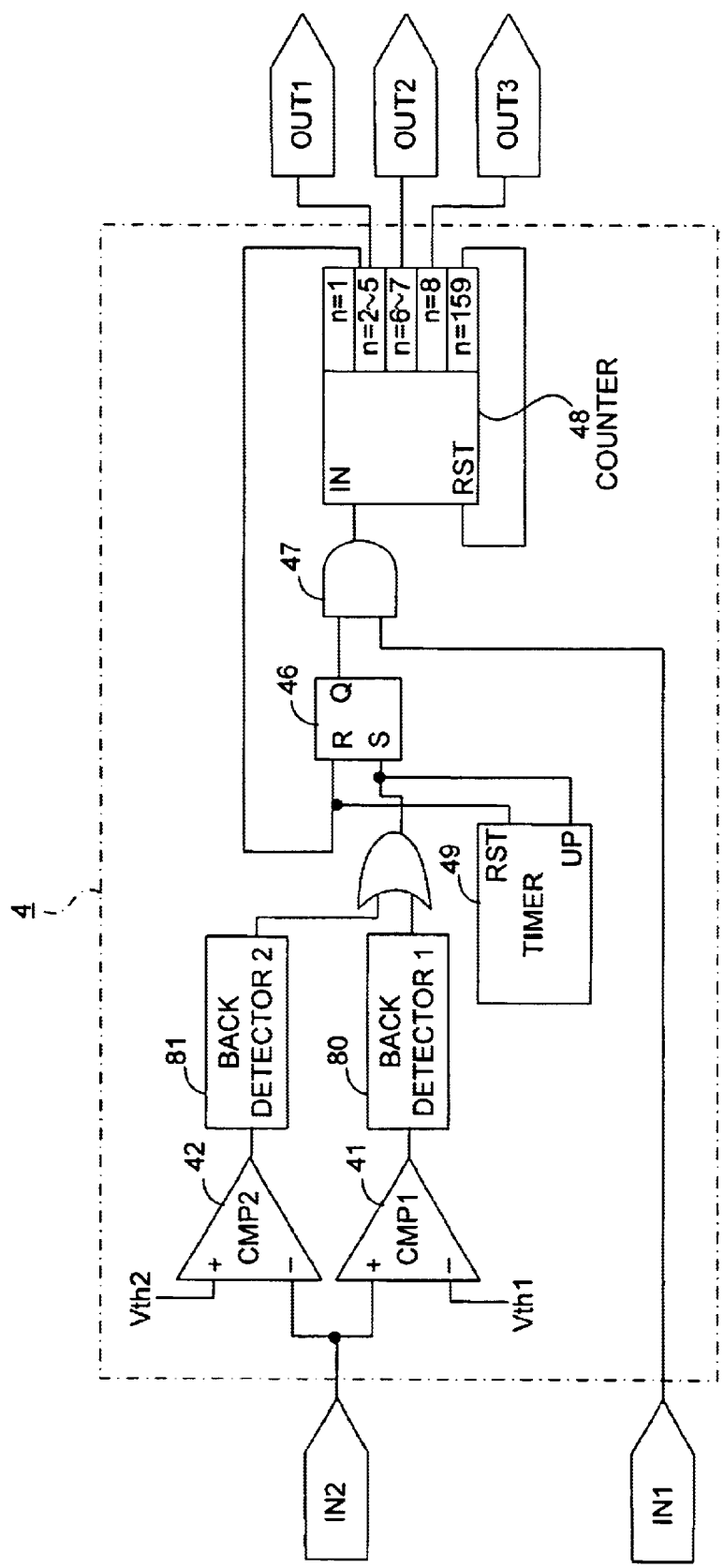
FIG. 9 is a circuit diagram of a pulse generator block according to a third embodiment of the invention.

FIG. 9 shows still another pulse generator block 4 according to a third embodiment of the invention characterized wherein transmission of light is controlled so as to take place at a time immediately before the two zero-cross timings. The third embodiment is different from the second embodiment wherein there is a pair of (first and second) comparators (CMP1 and CMP2 as shown in FIG. 3) 41 and 42 and also a pair of (first and second) back detector circuits 80 and 81 connected in parallel to the set input terminal S of the flip-flop 46 through an OR gate 82.

The third embodiment is characterized wherein two timings immediately before the reception signal level V based on noise light crosses the AV zero level are detected on the basis of the threshold value Vth1 of the first comparator (CMP1) 41 and the threshold value Vth2 of the second comparator (CMP2) 42. Thus, light can be transmitted not only at the moment when the reception signal output level becomes lower than the threshold value Vth1 with positive polarity but also when it becomes above the threshold value Vth2 with negative polarity. The operations of a photoelectric sensor according to the third embodiment of the invention (characterized as incorporating a pulse generating block according to the third embodiment of the invention) are similar to those of a sensor according to the second embodiment of the invention described above and hence will not be repetitiously described.

Figure 10:
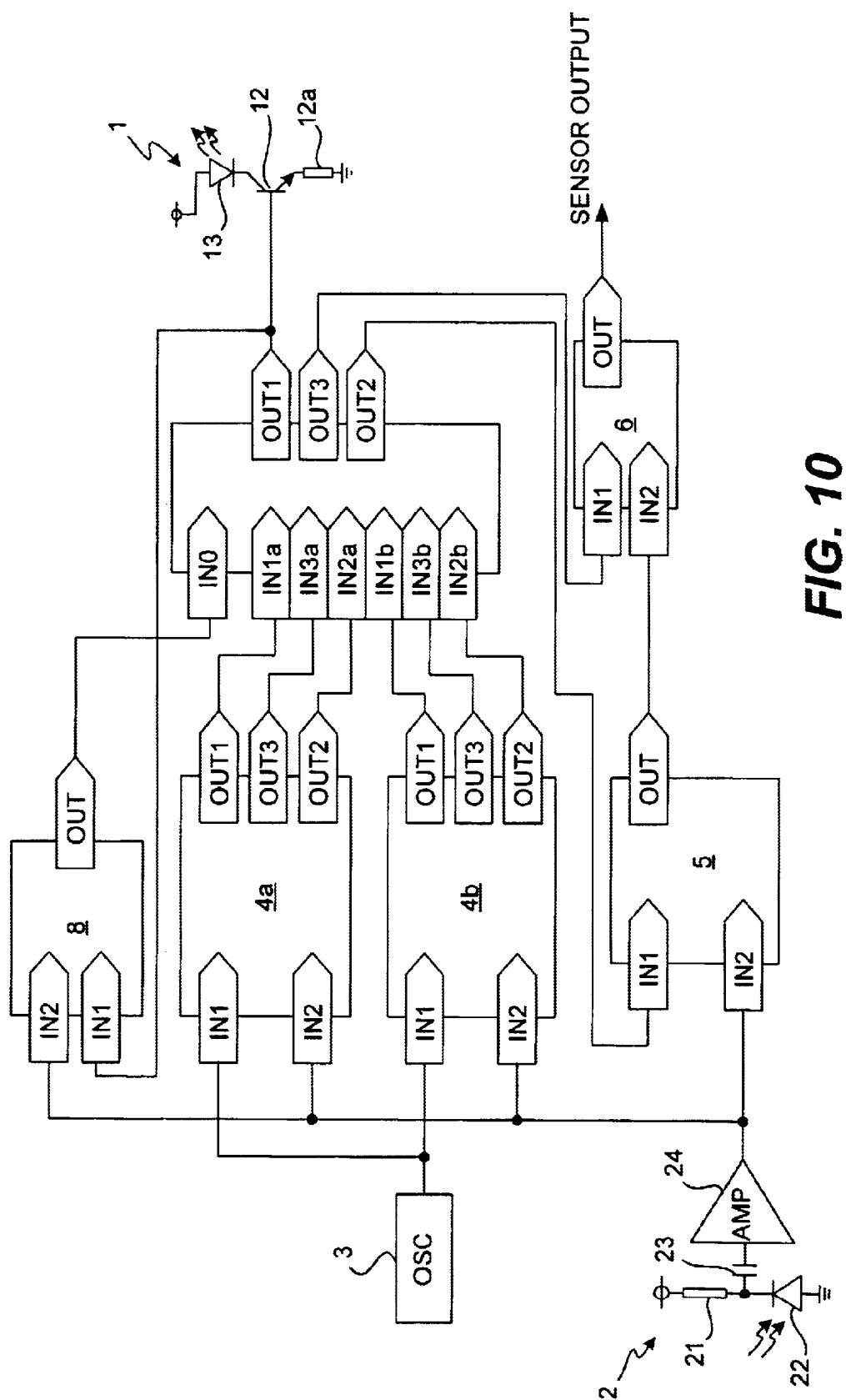
FIG. 10 is a block diagram of a mode switching type of photoelectric sensor according to a fourth embodiment of the invention.

FIG. 10 is a block diagram of a mode switching type of photoelectric sensor according to a fourth embodiment of the invention. The sensor according to the fourth embodiment is characterized wherein there are two (first and second) operating modes provided. The first operating mode is wherein light transmission is effected by waiting after specified light transmitting period has arrived (when the counter 48 counts the number n=1 according to this example) until the timing correspond to the appearance of a zero-cross on the reception signal waveform or until the arrival of a specified zero-cross. The second operating mode is characterized wherein light transmission takes place immediately after the specified light transmitting period has arrived or by waiting for a specified noise-avoiding period of time. The sensor is also provided with a function of noise detection and a function of automatically switching to the first mode if noise is detected and to the second mode if no noise is detected.

The photoelectric sensor according to the fourth embodiment of the invention is comprised of a light transmitter 1, a light receiver 2, an oscillator 3, pulse generator blocks 4a and 4b each having two input terminals IN1 and IN2 and three output terminals OUT1–3, a light level judging block 5, a signal processor block 6, a switch block 7 having six input terminals IN1a, IN2a, IN3a, IN1b, IN2b and IN3b, three output terminals OUT1–3 and a switch input terminal IN0, and a noise detector block 8 having two input terminals IN1 and IN2 and an output terminal OUT. The light transmitter 1, the light receiver 2, the oscillator 3, the light level judging block 5 and the signal processor block 6 are the same as described above with reference to the first embodiment and the third embodiment of the invention and hence will not be repetitiously described.

The noise detector block 8 serves to detect the presence or absence of any periodically changing noise light or noise electromagnetic waves and to output a signal indicative of the detected presence or absence of such noise through its output terminal OUT. The switch block 7 is for the purpose of switching between first and second operating modes to be described below according to the results of detection outputted by the noise detector block 8.

Explained more in detail, when a time-up signal (to be explained below) from the noise detector block 8 is inputted to input terminal IN0, the switch block 7 concludes that there is no noise of the type described above and the operating mode is switched to or maintained in the second mode in which the control pulse signals from output terminals OUT1–3 of the second pulse generator block 4b are taken in through input terminals IN1a–3a and outputted through corresponding output terminals OUT1–3 of the switch block 7. The second operating mode is the default mode according to this example.

In the absence of any output from the output terminal OUT of the noise detector block 8 for a specified length of time (such as 20 μs), it is concluded that there is noise present and the operating mode is switched to or maintained in the first mode in which the output signals from output terminals OUT1–3 of the first pulse generator block 4a are taken in through input terminals IN1b–3b and outputted through corresponding output terminals OUT1–3 of the switch block 7.

In summary, either the first or second pulse generator blocks 4a and 4b is appropriately selected according to the fourth embodiment of the invention, depending on the result of judgment, or detection, by the noise detector block 8 whether there is or is not any noise of the type described above, and the output signals from the selected pulse generator block (such as light transmission timing pulse, gate opening timing pulse and take-in timing pulse) from output terminals OUT1–3 are supplied to the light transmitter 1, the light level judging block 5 and the signal processor block 6.

Figure 11:
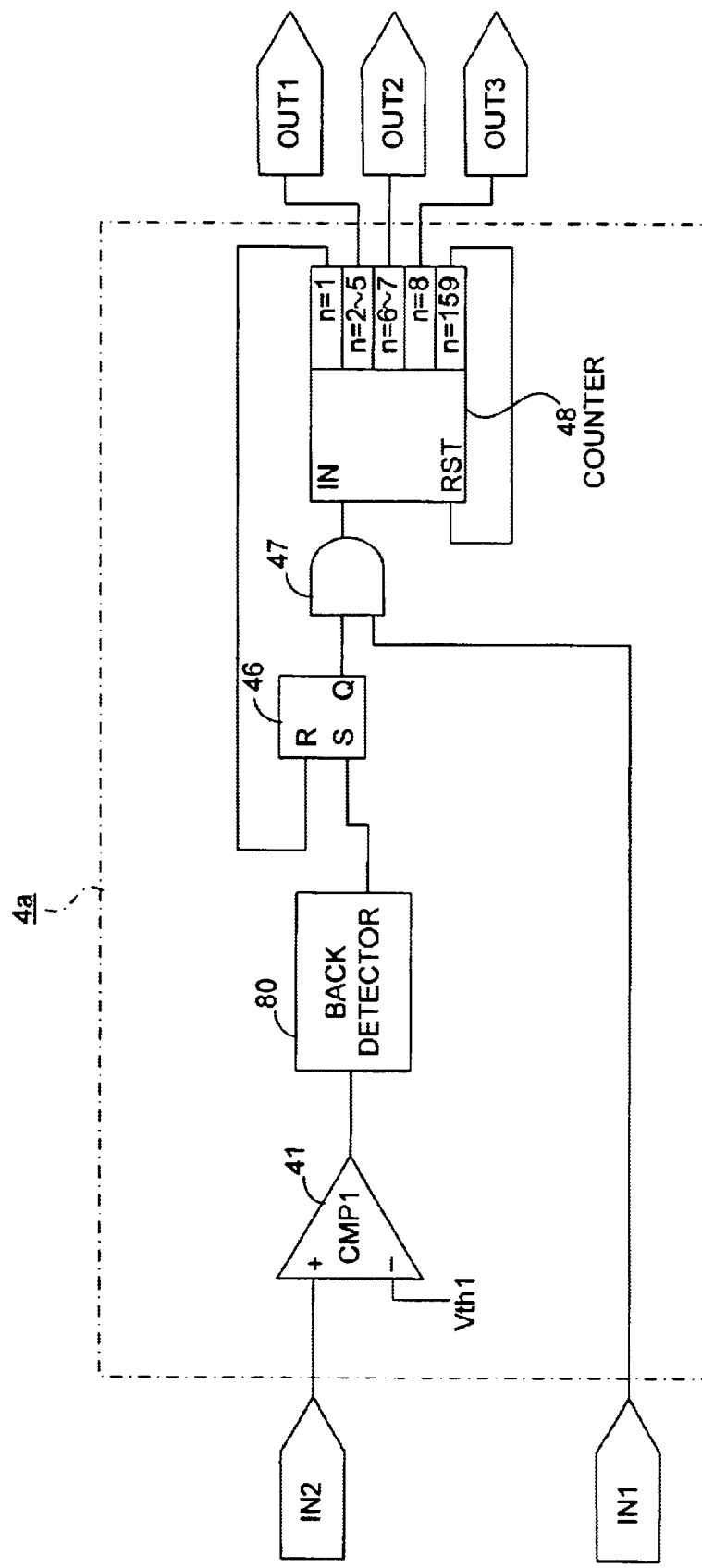
FIG. 11 is a circuit diagram of a pulse generator block for the sensor of FIG. 10 for use in the first operating mode.

FIG. 11 shows the circuit structure of the first pulse generator block 4a to be used when the first operating mode is selected. As can be understood easily, the first pulse generator 4a is structured similarly to the pulse generator block 4 according to the second embodiment of the invention described above with reference to FIG. 6 except that the delay monitoring timer T1 is missing. Thus, equivalent or similar components are indicated by the same numerals and will not be described repetitiously. The pulse generator block 4a shown in FIG. 11 also controls such that light is transmitted when the output level of the reception signal waveform Wn based on noise becomes lower than the threshold value Vth1 with positive polarity and that the specified zero-cross timing of the reception signal waveform based on noise and the timing of opening the sampling gate will match.

The first pulse generator block 4a is not provided with the delay monitoring timer T1 because it is intended to be used only when the first operating mode is selected and the first operating mode is selected on the condition that there is no noise having an AC waveform. Thus, the transmission of light is not likely to stop without a back position being detected. The delay monitoring timer T1 or the like may be provided in order to be prepared for the possibility of a sudden disappearance of the reception signal due to noise. In this example, however, the delay monitoring timer T1 is dispensed with for the advantage of simplifying the overall structure of the sensor.

Figure 12:
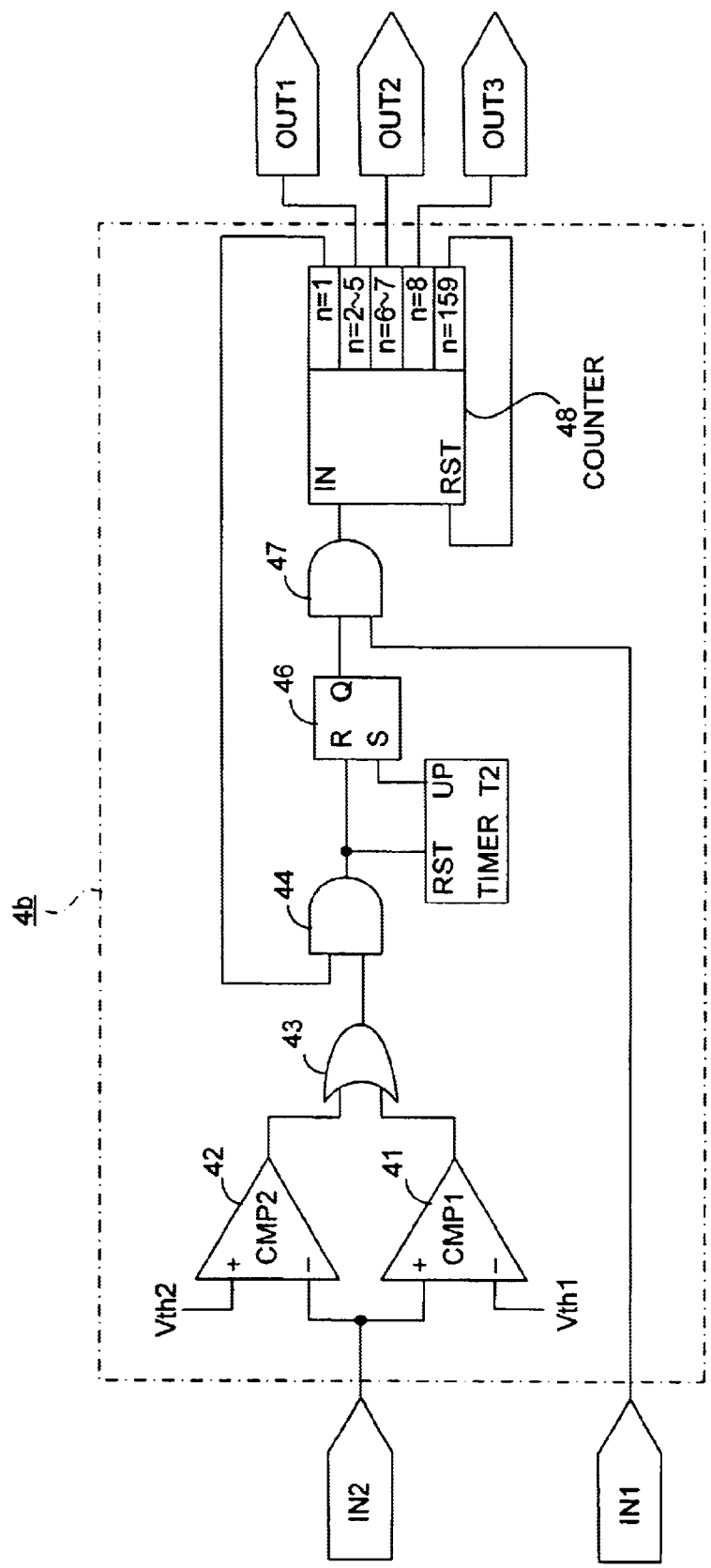
FIG. 12 is a circuit diagram of a pulse generator block for the sensor of FIG. 10 for use in the second operating mode.

FIG. 12 shows the circuit structure of the second pulse generator block 4b to be used when the second operating mode is selected. As can be understood easily, the second pulse generator 4b is structured similarly to the pulse generator block 4 according to the first embodiment of the invention described above with reference to FIG. 3 except that there is provided a light emission delaying timer T2, instead of the NOT gate 45 in the first embodiment. The light emission delaying timer T2 is adapted to be reset by an output from the AND gate 44 and to output a set signal to the flip-flop after the elapse of a specified length of time t2.

Explained more in detail, if the value V of the reception signal inputted from input terminal IN2 after an official light transmission period has been passed since the previous light transmission from the light transmitter 1 (the noise check timing) is not between the threshold values Vth1 and Vth2 of the first and second comparators (CMP1) 41 and (CMP2) 42, the timing for light transmission is delayed by the specified length of time t2 by interpreting that it was due to a kind of noise of a single occurrence and attempting to avoid such a single-time noise. This example is useful when pulses from similar adjacent sensors are to be regarded as noise and their mutual interference is to be prevented. For this reason, the time of delay t2 is set to 40 μs in view of the official light transmission period of 100 μs.

Figure 13:
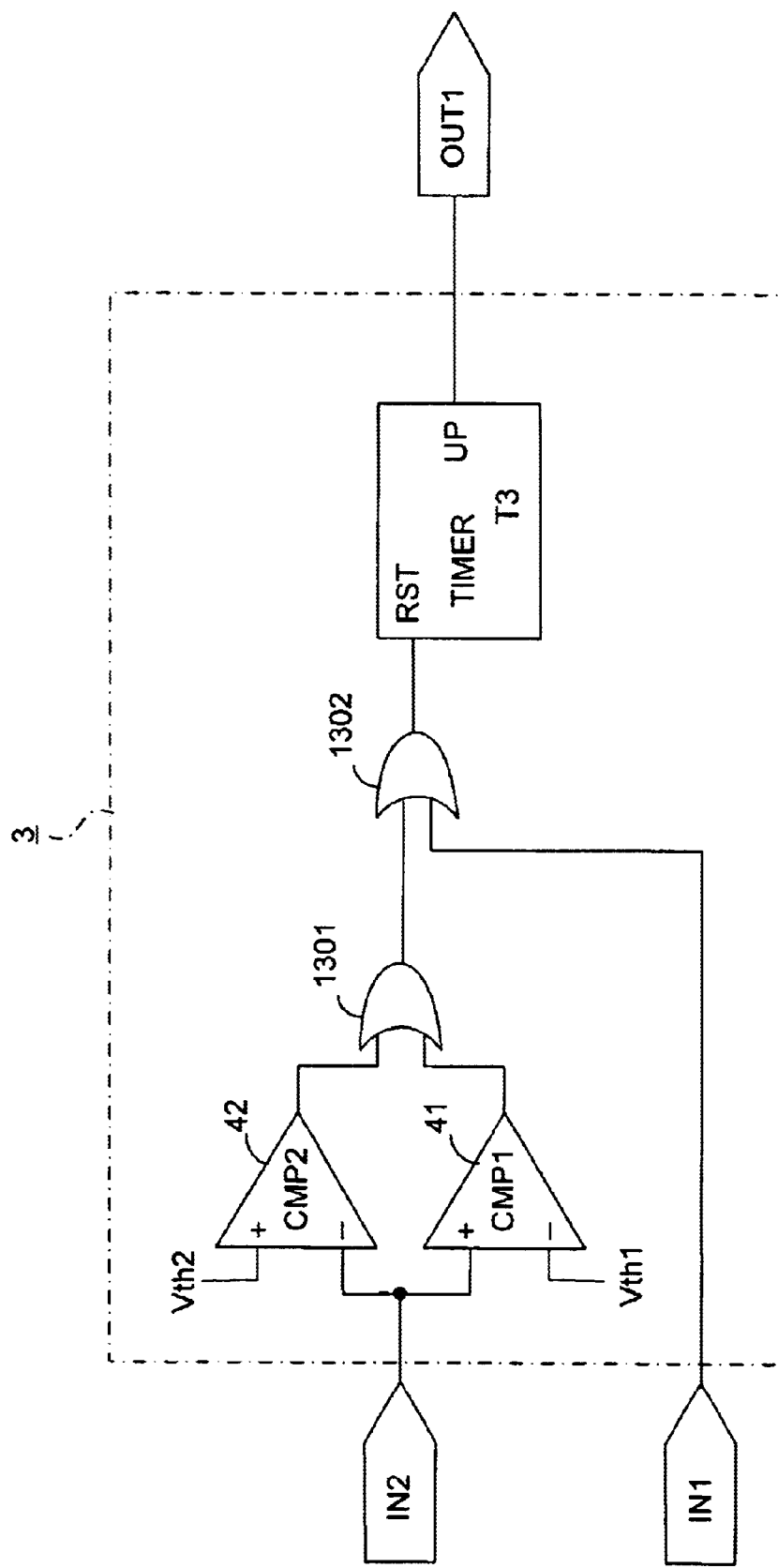
FIG. 13 is a circuit diagram of the noise detector block of FIG. 10.

As shown in FIG. 13, the noise detector block 8 is comprised of a pair of (first and second) comparators (CMP1) 41 and (CMP2) 42 connected in parallel on the output side of input terminal IN2, a first OR gate 1301 for obtaining the logical sum of the outputs from the two comparators 41 and 42, a second OR gate 1302 for obtaining the logical sum of the outputs from the first OR gate 1301 and input terminal IN1 and a monitoring timer T3 which is reset by the output from the second OR gate 1302 and outputs a time-up signal through output terminal UP serving as a noise detecting signal after the elapse of a specified length of time t3 (the "zero-cross time" t3=20 μs in this example).

The first and second comparators (CMP1) 41 and (CMP2) 42 are structured as explained above with reference to the second pulse generator block 4b and respectively have threshold values Vth1 (+25 mV) and Vth2 (−25 mV) near the output level zero. The value V of the reception signal inputted from the light receiver 2 through input terminal IN2 is compared with the threshold values Vth1 and Vth2 of the two comparators. If it is over Vth1 or below Vth2, a pulse is inputted to the reset signal input terminal RST of the monitoring timer T3 through the OR gates 1301 and 1302 and the monitoring timer T3 is thereby reset. According to this example, a light transmission timing pulse outputted from output terminal OUT1 of the switch block 7 is inputted to input terminal IN1 and then to the reset signal terminal RST of the monitoring timer T3 through the second OR gate 1302 and the monitoring timer T3 is thereby reset.

The monitoring timer T3 is for measuring (monitoring) the time during which the value V of the reception signal based on noise remains nearly at the zero level (or within the zero-cross range between +25 mV and −25 mV). While "H" is inputted on its reset signal input terminal (RST), the measurement is not continued. Thus, monitoring timer T3 outputs a time-up signal from output terminal UP, indicating that there is no noise, if the value V of the reception signal based on noise remains within the aforementioned zero-cross range for the specified period of time t3 (20 μs) shorter than the official light transmission period (100 μs). Since the timer t3 is reset if the time during which the value V remains in the zero-cross range is less than 20 μs due to the occurrence of noise or for whatever reason, the time-up signal is not outputted from output terminal UP. If such a situation lasts for a specified length of time, the switch block 7 concludes that noise is present and the second operation mode is selected.

As can be understood from the description above, the detection of presence or absence of noise according to the fourth embodiment of this invention is carried out constantly from one light transmission to the next light transmission, selecting each time between switching the operation mode and remaining in the same operation mode.

Figure 14:
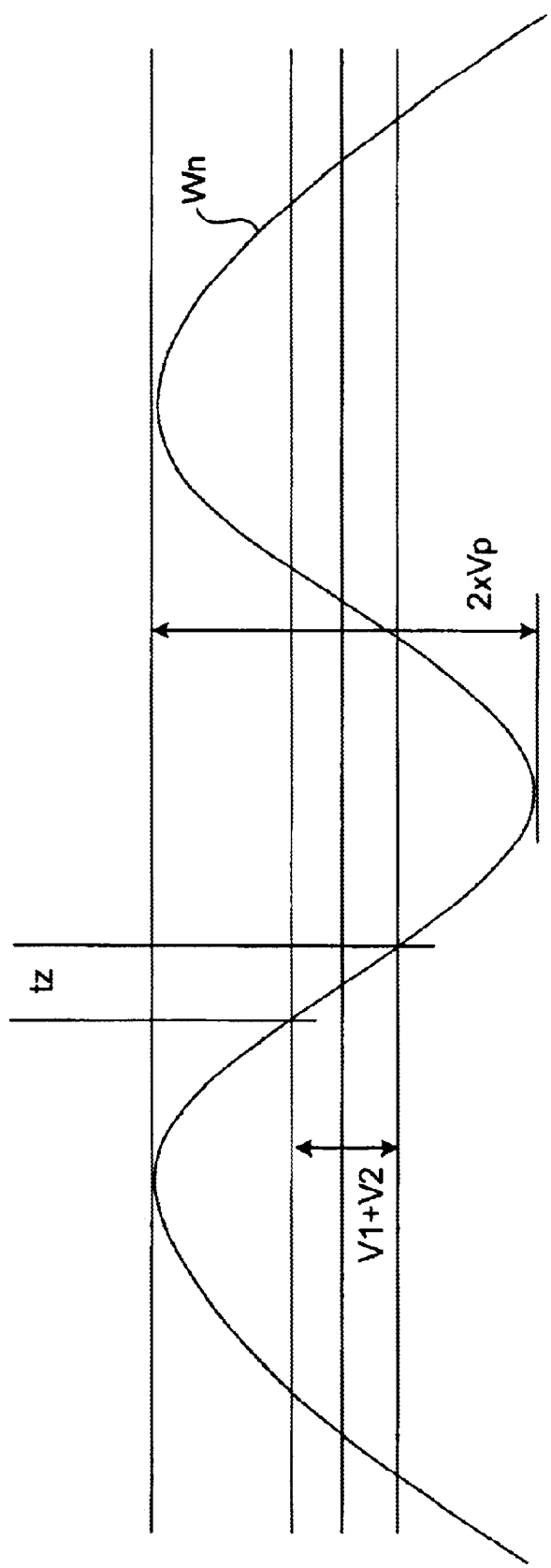
FIG. 14 is a diagram for explaining the method of calculating the zero-cross timing.

Although presence and absence of noise are determined according to the example described above, depending upon whether the "zero-cross time" tz (the duration of time during which the reception signal value V is maintained nearly at the zero level during the interval between one light transmission to the next light transmission) is greater than a specified length of time t3, the zero-cross time may be obtained by a direct calculation. The zero-cross time tz may be calculated, for example, as follows:

$$tz = \{T \sin^{-1}(\{V_1+V_2\}/2V_p)\}/2\pi$$

by using values $V_1$, $V_2$ and $V_p$ shown in FIG. 14, that is, $V_1$ and $V_2$ are the absolute values of Vth1 and Vth2, respectively (or 25 mV), $V_p$ is the half peak value of the reception signal waveform Wn based on noise (80 mV in this example) and T is the period of the reception signal waveform Wn based on noise.

Figure 15:
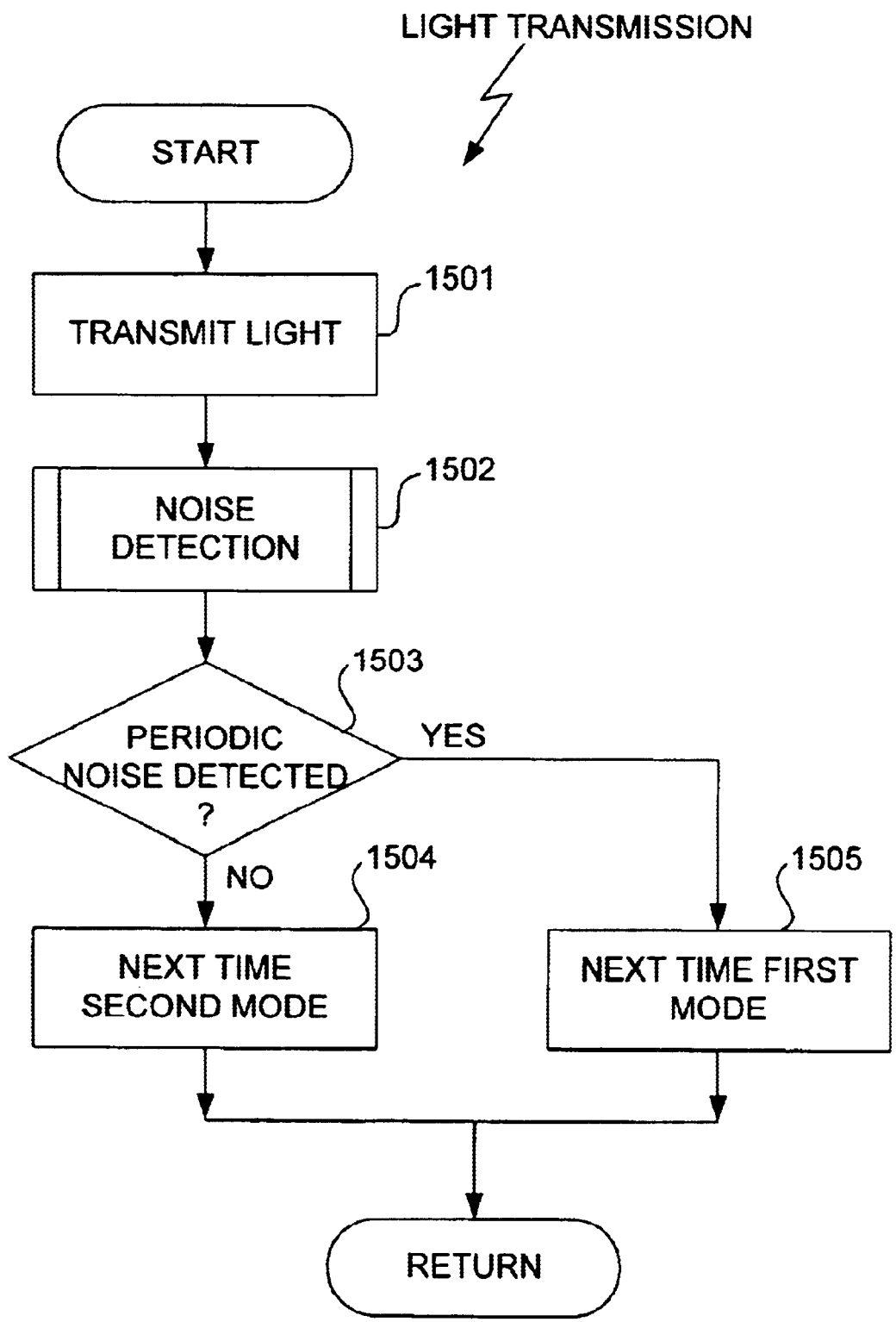
FIG. 15 is a flowchart of the procedure for switching operation mode of the photoelectric sensor according to the fourth embodiment of the invention.

The flowchart in FIG. 15 is referenced next to describe a process for switching between the operation modes for the photoelectric sensor according to the fourth embodiment of the invention.

As shown in the flowchart, when a time for actual transmission of light arrives (such as when the count number n is 2–5), a pulse of light is transmitted from the light transmitter 1 (Step 1501) and a noise detection routine is also carried out through the noise detector block 8 (Step 1502). If noise is detected by the noise detection block 8 (YES in Step 1503), the light transmitter 1 is set such that the next light pulse transmission will be carried out in the first mode (Step 1505). If it is determined that there is no noise (NO in Step 1503), on the other hand, the light transmitter 1 is set such that the next light pulse transmission will be carried out in the second mode (Step 1504).

Figure 16:
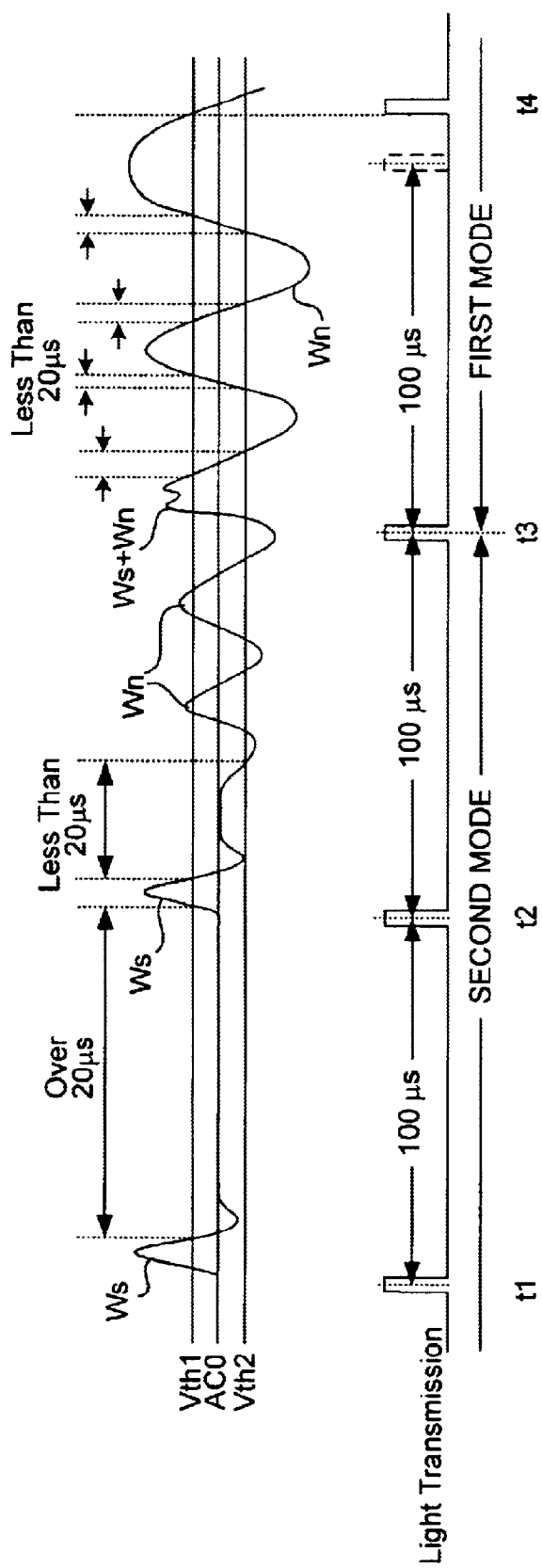
FIG. 16 is a diagram for showing an example of change in waveform when the operation mode is switched for a photoelectric sensor according to the fourth embodiment of the invention.

The manner in which the waveform of the signal received by the light receiver 2 changes at the time of a mode change is explained next with reference to FIG. 16 wherein Wn+Ws indicates a compound waveform for both reception signals based on the pulse transmitted by the sensor itself and noise.

During the first period between $t_1$ when a light pulse is transmitted and $t_2$ when the next light pulse is transmitted, there is no noise and hence there is no waveform Wn based on noise light. Thus, the zero-cross time tz is maintained to be over 20 μs and the second operation mode continues to be selected at $t_2$. During the next period between $t_2$ and $t_3$ when the next light pulse transmission takes place, however, noise is detected and there appears a waveform Wn indicative of an effect of the noise. As a result, the zero-cross time tz becomes less than 20 μs and the first operation mode is selected for the light pulse transmission subsequent to $t_3$.

In this example, the light pulse transmission takes place at the official light transmission period of 100 μs. The next light pulse transmission after $t_3$ is shown as taking place at $t_4$ matching a specified zero-cross timing of the reception signal waveform (as it changes from positive to negative).

Figure 17:
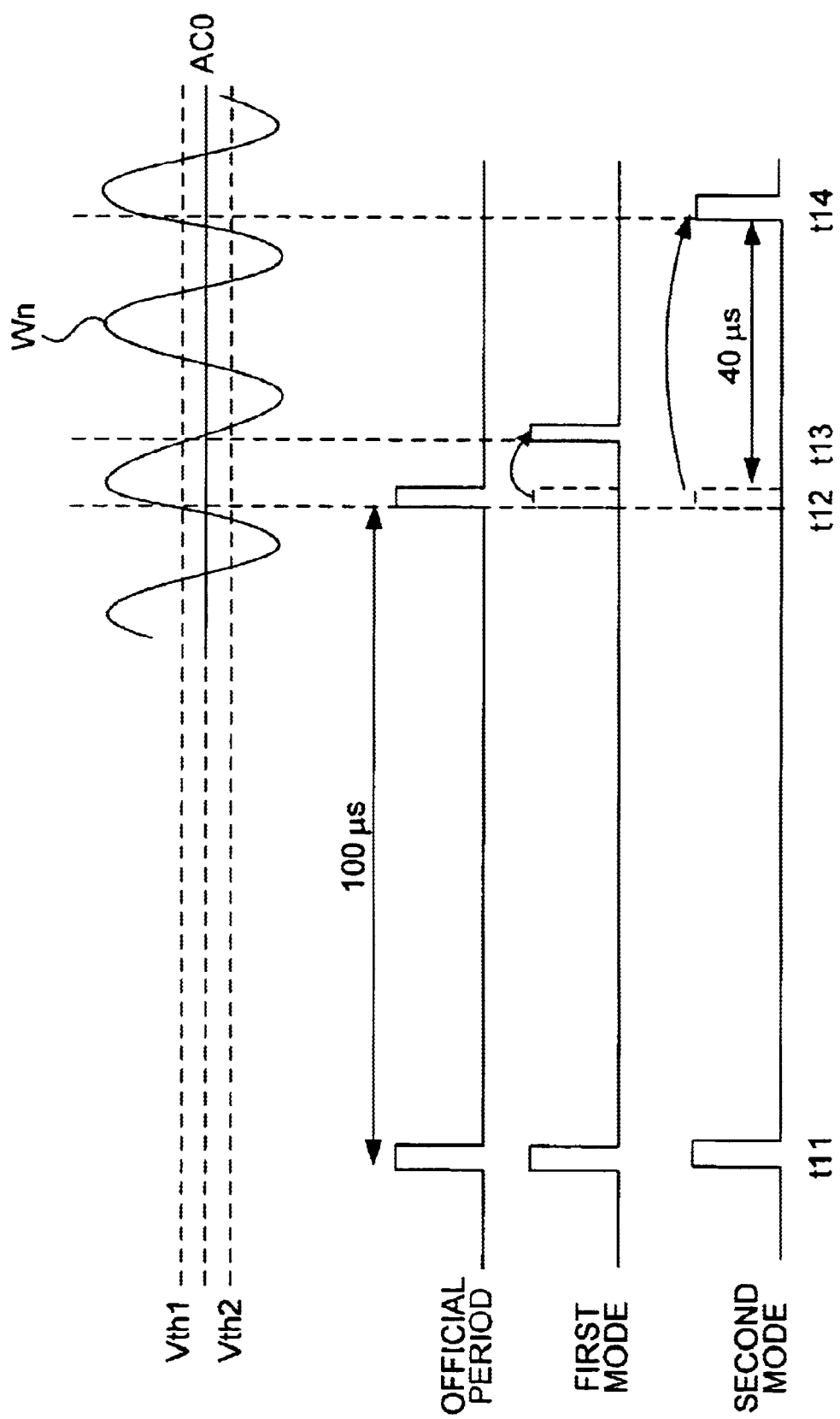
FIG. 17 is a diagram for showing the control of timing for light transmission for each of the two modes.

The timing control of light pulse transmission is explained more in detail with reference to FIG. 17 for showing clearly the difference between the two operating modes in the presence of noise, that is, in the presence of waveform Wn based on noise.

FIG. 17 shows that a light pulse was transmitted at $t_{11}$ and that the next light pulse is expected to be transmitted at $t_{12}$ after an official light transmission period of about 100 μs when the count number n becomes 1. As shown, however, the reception signal based on noise is at a level slightly above the threshold value Vth1 at the noise check timing. In the first mode, the light transmitter 1 will wait until $t_{13}$ to transmit light when the signal value V becomes less than the threshold value Vth1 with positive polarity. In the second mode, the next transmission (after $t_{11}$) takes place after the light transmitter 1 waits for a specified length of wait time (40 $\mu$s) until $t_{14}$. FIG. 17 shows a particular situation wherein the waveform Wn based on noise is exceeding the threshold value Vth1 and heading for an output peak at the actual time of light pulse transmission $t_{14}$ in the second mode. This means that the timing of opening the sampling gate and the timing for the appearance of an output peak of the noise light is likely to coincide. This indicates that a more accurate detection is possible with the first operating mode than with the second operating mode in the presence of noise light.

The second mode is more effective than the first mode, as explained above, for preventing mutual interference. In the second mode, the official light transmission period can be made variable on the basis of the mutual exclusive logical sum (exclusive OR) between stages 1 and 8 of the shift register 61 of the signal processor block 6. Explained more in detail, this may be done by arranging such that the official light transmission period will be changed from 100 $\mu$s to 80 $\mu$s (80% of 100 $\mu$s) after a delay by 40 $\mu$s in light transmission if the exclusive OR of stages 1 and 8 is "H". In this manner, even if there are two similar sensors next to each other and the period of appearance of reception signal waveform based on pulse light from them and that of the light transmitted by the sensor itself may coincide completely, failure to delay transmission of light due to their mutual interference can be avoided.

Figure 18:
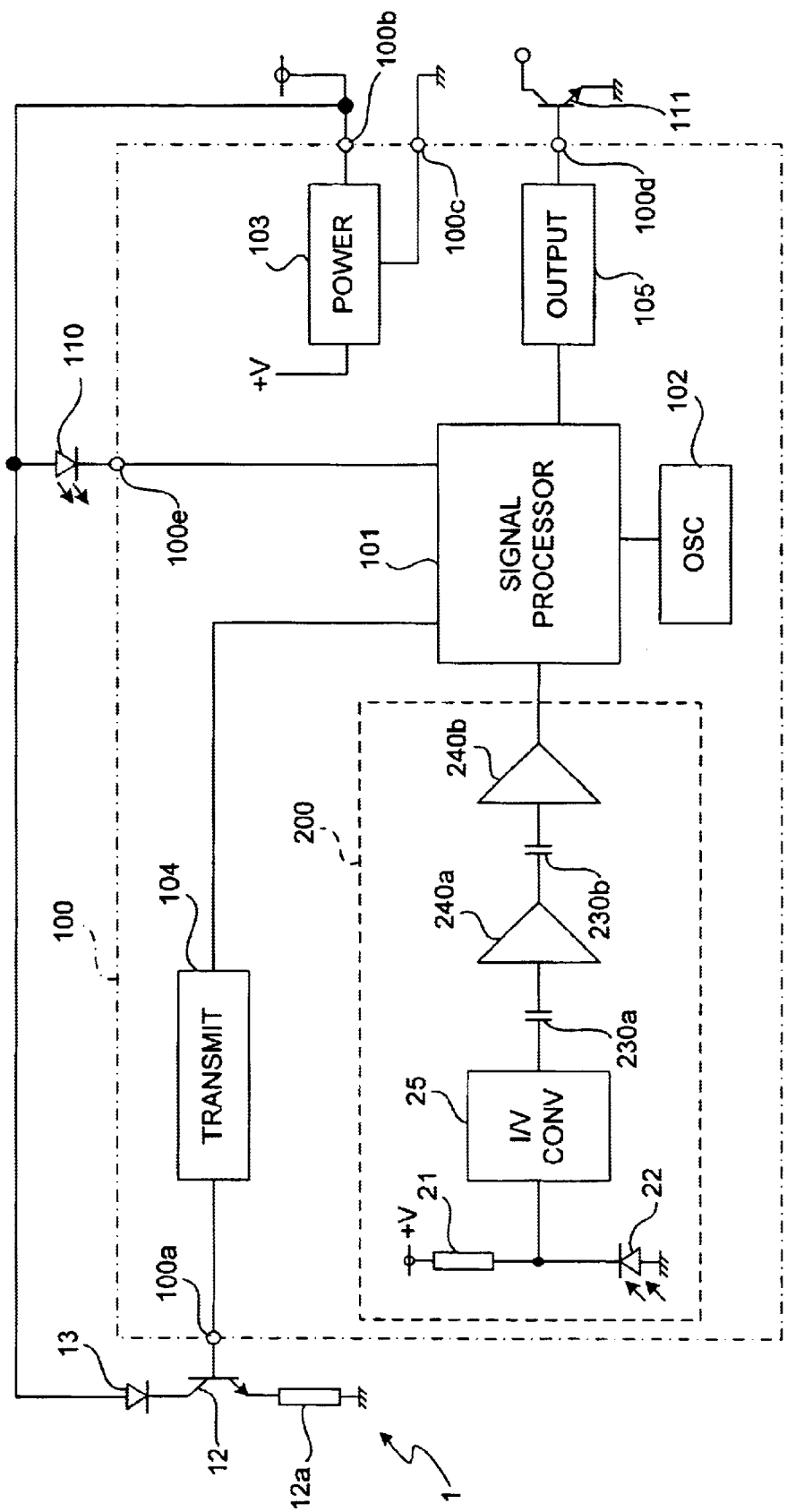
FIG. 18 is a circuit diagram of a photoelectric sensor according to a fifth embodiment of the invention.

FIG. 18 shows a photoelectric sensor according to a fifth embodiment of this invention characterized as being a sensor according to the fourth embodiment of this invention shown in FIG. 10 formed as a one-chip IC. It is comprised of a light transmitter 1, a one-chip IC 100 and a display lamp 110 such as an LED for displaying the operating condition (such as the on/off judgment) of the sensor. The light transmitter 1 is the same as that explained above with reference to FIG. 10. Integrally formed on the semiconductor substrate of the one-chip IC 100 are a signal processor circuit 101, an oscillator circuit (OSC) 102, a power source circuit (POWER) 103, a light transmitting circuit (TRANSMIT) 104, an output circuit 105 and a light receiving circuit 200. The light receiving circuit 200 includes a photodiode 22, an I/V converter 25, connecting capacitors 230a and 230b, a preamplifier 240a and a power amplifier 240b. The output due to received light obtained from the photodiode 22 is converted by the I/V converter 25, amplified by the preamplifier 240a and the power amplifier 240b and supplied to the signal processor circuit 101 as a reception signal. The connecting capacitors 230a and 230b serve to cut off low-frequency components, eliminating voltage variations (AC components) at each junction point to supply the signal to the amplifier on the downstream side.

In general, the amplification ratio for received signals becomes quite large in the signal processing by a photoelectric sensor. In order to minimize the effects of noise, it is imperative to shorten as much as possible the wires in the signal amplification circuit. In this example, therefore, the internally formed capacitors 230a and 230b are used to couple the photodiode 22 with the preamplifier 240a and the preamplifier 240a with the power amplifier 240b, instead of using externally provided capacitors.

The oscillator circuit 102 serves to generate standard clock pulses and to supply them to the signal processor circuit 101. The power source circuit 103 serves to receive power from outside through a power intake terminal 100b and a first external terminal 100c and to supply a constant voltage to the various circuit parts.

The signal processor circuit 101 serves to carry out the functions of the noise detector block 8, the pulse generator blocks 4a and 4b, the light level judging block 5, the signal processor block 6 and the switch block 7 which were explained above with reference to FIG. 10 with the help of the light transmitting circuit 104 and the output circuit 105. In short, the signal processor circuit 101 serves to output control signals to the light transmitting circuit 104 for controlling the timing of light transmission on the basis of reception signals from the light receiving circuit 200.

The light transmitting circuit 104 serves to receive this control signal from the signal processor circuit 101 and to transmit light transmission timing pulses as driving control signals to the driver circuit 12 of the light transmitter 1 connected through a second external terminal 100a.

The signal processor circuit 101 also serves to make (on/off) judgment for the purpose of a sensor output on the basis of reception signals supplied from the light receiving circuit 200 and to output a control signal based on this judgment to the output circuit 105. The output circuit 105 is electrically connected to a switching transistor 111 through a third external terminal 100d and serves to receive this control signal from the signal processor circuit 101 and to output driver pulses as sensor output to this switching transistor 111. Although not shown in the figure, this switching transistor 111 is connected to a sensor load which is an object of control by this photoelectric sensor. Examples of the sensor load may include an input circuit (comprising, say, a relay and a photo-coupler) forming an input unit of a programmable logic controller. In other words, the switching transistor 111 serves as a driver circuit for the sensor load and the output circuit 105 controls the power supply to the sensor load through this switching transistor 111.

The signal processor circuit 101 further serves to output a control signal to the display lamp 110 for switching it on or off, depending on the result of the aforementioned (on/off) judgment such that the user can easily ascertain the sensor output.

The fifth embodiment is advantageous in that the functions of main circuits for the photoelectric sensor according to the fourth embodiment of the invention can be integrated as a one-chip IC such that the device can be miniaturized and the production cost can be reduced. Although an example was shown above wherein the photodiode 22 was made a part of the IC, an externally provided photodiode may be used instead such that a photodiode with a larger light receiving surface can be used and hence the sensitivity of the sensor can be improved. Although expression "sampling gate" has been used frequently in the above description, the present invention is applicable to all sorts of photoelectric sensors which synchronize the timing of light transmission with that of judging the level of received light. The presence of a sampling gate is not to be considered a necessary element of the invention.

In summary, the present invention provides photoelectric sensors using light pulses capable of functioning effectively even in the presence of noise pulses which appear periodically and at a timing coinciding with that of judging the level of received light.

What is claimed is:

1. A method of controlling a photoelectric sensor, said method comprising the steps of:
    transmitting pulsed light repetitively by driving a light transmitting element of said photoelectric sensor at a specified light transmission timing;
    comparing the level of reception signal with a specified first threshold value and thereby judging the level of said reception signal at a level-judging timing which is slightly delayed from said light transmission timing, said reception signal being outputted according to an output from a light receiving element of said photoelectric sensor for receiving light;

making a comparison, if said reception signal includes an AC waveform corresponding to noise, between said level of reception signal and a second threshold value proximal to an AC zero level determined from said AC waveform; and controlling the timing of next light transmission from said photoelectric sensor based upon the result of said comparison.

2. The method of claim 1 wherein said timing of next light transmission is one at which the polarity of said AC waveform corresponding to noise changes to become opposite the polarity of waveform of reception signal corresponding to pulsed light transmitted from said photoelectric sensor.

3. A photoelectric sensor comprising:

light transmitting means for transmitting pulsed light repetitively by driving a light transmitting element at a specified light transmission timing;

light receiving means for receiving light and outputting an electrical reception signal corresponding to said received light;

first level judging means for comparing the level of said reception signal with a specified first threshold value, thereby judging the level of said reception signal at a level-judging timing which is slightly delayed from said light transmission timing;

signal processor means for generating a sensor output based upon the result of a comparison by said first level judging means;

second level judging means for comparing the level of said reception signal with a second threshold value proximal to an AC zero level, thereby judging the level of said reception signal; and transmission timing control means for controlling the timing of next light transmission from said light transmitting means based upon the result of a comparison by said second level judging means.

4. The photoelectric sensor of claim 3 wherein said second threshold value of said second level judging means is smaller than said first threshold value of said first level judging means.

5. The photoelectric sensor of claim 3 wherein said transmission timing control means delays the timing of next light transmission, after an official light transmission period has elapsed since the previous timing of light transmission, until said second level judging means judges that the level of said reception signal is close to said AC zero level.

6. The photoelectric sensor of claim 5 wherein said second level judging means employs two threshold values near said AC zero level, one of said two threshold values having positive polarity and the other of said two threshold values having negative polarity, said second level judging means judging that the level of said reception signal is close to said AC zero level only if said level of received signal is within a range sandwiched between said two threshold values.

7. The photoelectric sensor of claim 3 wherein said transmission timing control means delays the timing of next light transmission, after an official light transmission period has elapsed since the previous timing of light transmission, until said second level judging means judges that the polarity of the level of said reception signal is changing in a direction for becoming opposite of the polarity of a normal reception signal corresponding to a normal light pulse transmitted from said sensor itself.

8. The photoelectric sensor of claim 7 wherein said transmission timing control means generates a light transmission timing signal for said next light transmission immediately after a preset wait period after an official light transmission period has elapsed since the previous timing of light transmission, if said second level judging means does not judge that the polarity of the level of said reception signal is changing in a direction for becoming opposite of the polarity of a normal reception signal corresponding to a normal light pulse transmitted from said sensor itself.

9. The photoelectric sensor of claim 3 wherein said second level judging means comprises:

a comparator for detecting appearance of a reception signal exceeding a specified threshold value having the same polarity as the polarity of a normal reception signal corresponding to normal pulse light transmitted from said sensor; and a back detector circuit for detecting the back end position of an output signal outputted from said comparator in response to said appearance;

wherein said transmission timing control means delays the timing of the next light transmission until the back end position of said output signal from said comparator is detected by said back detector circuit.

10. The photoelectric sensor of claim 9 wherein said transmission timing control means includes a timer which starts counting time selectively when an official light transmission period has passed or when a back end position of said output signal from said comparator is detected by said back detector circuit and generates a light transmission timing signal for the next light transmission when a specified period of time has elapsed.

11. The photoelectric sensor of claim 3 wherein said transmission timing control means delays the timing of next light transmission, after an official light transmission period has elapsed since the previous timing of light transmission, until said second level judging means judges that the polarity of the level of said reception signal is changing in a direction for becoming the same or opposite of the polarity of a normal reception signal corresponding to a normal light pulse transmitted from said sensor itself.

12. The photoelectric sensor of claim 3 wherein said second level judging means comprises:

a first comparator for detecting appearance of a reception signal exceeding a first threshold value having the same polarity as the polarity of a normal reception signal corresponding to normal pulse light transmitted from said sensor;

a second comparator for detecting appearance of a reception signal exceeding a second threshold value having the opposite polarity to the polarity of a normal reception signal corresponding to normal pulse light transmitted from said sensor;

a first back detector circuit for detecting the back end position of an output signal outputted from said first comparator in response to the appearance of a reception signal exceeding said first threshold; and a second back detector circuit for detecting the back end position of an output signal outputted from said second comparator in response to the appearance of a reception signal exceeding said second threshold;

wherein said transmission timing control means delays the timing of the next light transmission until the back end position of the output signal from either of said first comparator and said second comparator is detected by corresponding one of said first back detector circuit and said second back detector circuit.

13. The photoelectric sensor of claim 3 wherein said transmission timing control means is operable selectably in a first operating mode or a second operating mode; said first operating mode being wherein said transmission timing control means delays the timing of next light transmission, after an official light transmission period has elasped since the previous timing of light transmission, until said second level judging means judges that the polarity of the level of said reception signal is changing in a direction of becoming the opposite of the polarity of a normal reception signal corresponding to a normal light pulse transmitted from said sensor itself; said second operating mode being wherein said transmission timing control means causes light transmission immediately after an official light transmission period has elapsed since the previous timing of light transmission or thereafter waiting for a specified length of time.

14. The photoelectric sensor of claim 13 further comprising:

noise detector means for detecting noise light and electromagnetic noise waves causing a reception signal which varies periodically, having an AC waveform, wherein said first mode and said second mode are selected, depending on whether or not noise light or electromagnetic noise waves are detected by said noise detector means.

15. The photoelectric sensor of claim 14 wherein said noise detector means detects presence of noise by determining whether or not the level of a reception signal remains nearly at an AC zero level for a specified length of time shorter than the official light transmitting period.

16. The photoelectric sensor of claim 13 further comprising:

time measuring means for measuring time during which the level of a reception signal continuously remains nearly at an AC zero level for a specified length of time shorter than the official light transmitting period; and mode switching means for switching to said second mode if the time measured by said time measuring means exceeds said specified length of time and to said first mode if the time measured by said time measuring means is shorter than said specified length of time.

17. A semiconductor integrated circuit for a photoelectric sensor having a light transmitting element and a light receiving element, said integrated circuit comprising:

a first external terminal for supplying power;

a second external terminal for outputting a transmission controlling signal for a driver circuit for said light transmitting element;

a third external terminal for outputting a sensor load controlling signal for a driver circuit for sensor load;

a power source circuit for receiving power through said first external terminal and providing a stabilized power source for internal circuits of said semiconductor integrated circuit;

a light receiving circuit for outputting a reception signal according to light received by said light receiving element;

a light transmitting circuit for outputting said transmission controlling signal to said second external terminal;

an output circuit for outputting said sensor load controlling signal to said third external terminal; and a signal processor circuit for controlling said output circuit and said light transmitting circuit by said reception signal received from said light receiving circuit;

wherein said light receiving circuit, said light transmitting circuit, said output circuit and said signal processor circuit are integrated;

wherein said signal processor circuit comprises:

a first level judging means for comparing said reception signal with a specified threshold value at a timing slightly delayed from the timing of light transmission from said light transmitting element;

a signal processing means for generating a sensor output according to a result of comparison by said first level judging means and supplying said sensor output to said output circuit;

a second level judging means for comparing said reception signal with another threshold value near an AC zero level; and a light transmission timing controlling means for supplying to said light transmitting circuit a light transmission timing control signal for controlling the timing of next light transmission from said light transmitting element according to the comparison by said second level judging means.

18. The semiconductor integrated circuit of claim 17 wherein said signal processor circuit is selectably operable in a first mode and a second mode;

said first mode being wherein said timing of next light transmission is delayed until it is determined by said second level judging means that the level of said reception signal is changing in a direction of having the opposite polarity to that of a normal reception signal corresponding to a normal pulse transmitted from said light transmitting element; and said second mode being wherein the next light transmission is caused immediately after a specified length of time since the previous transmission of light from said light transmitting element.

* * * * *